United States Patent
Cofer et al.

(10) Patent No.: US 7,200,246 B2
(45) Date of Patent: Apr. 3, 2007

(54) OBJECT DETECTION

(75) Inventors: Darren Duane Cofer, Minnetonka, MN (US); Rida M. Hamza, Inver Grove Heights, MN (US)

(73) Assignee: Honeywell International Inc., Morristown, NJ (US)

(*) Notice: Subject to any disclaimer, the term of this patent is extended or adjusted under 35 U.S.C. 154(b) by 899 days.

(21) Appl. No.: 09/981,928

(22) Filed: Oct. 16, 2001

(65) Prior Publication Data

US 2002/0061134 A1 May 23, 2002

Related U.S. Application Data

(63) Continuation-in-part of application No. 09/716,002, filed on Nov. 17, 2000, now Pat. No. 6,711,279.

(60) Provisional application No. 60/275,879, filed on Mar. 14, 2001.

(51) Int. Cl.
*G06K 9/00* (2006.01)

(52) U.S. Cl. .................. 382/103; 382/282; 382/286; 382/291; 348/152; 348/156

(58) Field of Classification Search ................ 382/103, 382/199, 282, 291, 307, 209, 219, 104, 286; 348/143, 152, 135, 156, 139
See application file for complete search history.

(56) References Cited

U.S. PATENT DOCUMENTS 4,249,207 A    2/1981  Harman et al.
4,408,224 A *  10/1983 Yoshida ................ 348/155
4,458,266 A *  7/1984  Mahoney ............... 348/155
4,857,912 A *  8/1989  Everett et al. .......... 340/508

(Continued)

FOREIGN PATENT DOCUMENTS

DE          19619688 A    11/1997

(Continued)

OTHER PUBLICATIONS

The Japan Machinery Federation, "Development for the International Standards in the field of Safety Machinery—A vision-based protective device (VBPD)," *The Japanese National Committee for IEC/TC44*, 36 pages, Oct. 1, 2001.

(Continued)

*Primary Examiner*—Matthew C. Bella
*Assistant Examiner*—Yosef Kassa
(74) *Attorney, Agent, or Firm*—Kris T. Fredrick

(57) ABSTRACT

A visual object detection system to provide access and/or presence monitoring of an area of interest. In steady state operation, that is when no object is entering or within the area of interest, only those portions of the incoming images that correspond to the border of the area of interest are analyzed. Once the border is breached by an object, the present invention may begin analyzing the entire area or selected regions inside the border of the area of interest. This may provide some level of presence monitoring of the area of interest. It is contemplated that both modes of analysis can take place simultaneously or sequentially, depending on the application. Once the object leaves the area of interest, the present invention preferably returns to the original steady state, and monitors only the border regions of the incoming images.

45 Claims, 26 Drawing Sheets

U.S. PATENT DOCUMENTS

| | | | |
|---|---|---|---|
| 4,923,066 A | | 5/1990 | Ophir et al. |
| D347,442 S | | 5/1994 | Falconer |
| D349,713 S | | 8/1994 | Hasegawa |
| D349,714 S | | 8/1994 | Hasegawa |
| D349,911 S | | 8/1994 | Shimizu et al. |
| D349,913 S | | 8/1994 | Morris |
| 5,359,363 A | | 10/1994 | Kuban et al. |
| D354,973 S | | 1/1995 | Hisatune et al. |
| 5,402,168 A | | 3/1995 | Fouilloy |
| 5,418,567 A | | 5/1995 | Boers et al. |
| 5,448,320 A | | 9/1995 | Sakai et al. |
| 5,465,115 A | * | 11/1995 | Conrad et al. ............. 348/155 |
| 5,477,212 A | | 12/1995 | Rumpel |
| D365,834 S | | 1/1996 | Dozier |
| 5,509,082 A | * | 4/1996 | Toyama et al. ............ 382/104 |
| 5,541,585 A | * | 7/1996 | Duhame et al. ........... 340/5.62 |
| 5,573,006 A | | 11/1996 | Shimotani et al. |
| 5,574,498 A | * | 11/1996 | Sakamoto et al. .......... 348/169 |
| D378,095 S | | 2/1997 | Hasegawa |
| 5,627,616 A | | 5/1997 | Sergeant et al. |
| 5,649,255 A | | 7/1997 | Schieltz |
| 5,677,535 A | | 10/1997 | Stephan |
| 5,691,765 A | | 11/1997 | Schieltz et al. |
| 5,721,692 A | * | 2/1998 | Nagaya et al. ............. 345/475 |
| 5,729,471 A | * | 3/1998 | Jain et al. .................... 725/131 |
| 5,731,832 A | * | 3/1998 | Ng ............................. 348/155 |
| 5,745,170 A | | 4/1998 | Palmer |
| 5,752,100 A | | 5/1998 | Schrock |
| 5,790,910 A | | 8/1998 | Haskin |
| 5,793,900 A | | 8/1998 | Nourbakhsh et al. |
| 5,795,306 A | | 8/1998 | Shimotani et al. |
| 5,801,770 A | | 9/1998 | Paff et al. |
| D399,517 S | | 10/1998 | Hasegawa |
| 5,818,519 A | | 10/1998 | Wren |
| 5,835,613 A | | 11/1998 | Breed et al. |
| 5,845,000 A | | 12/1998 | Breed et al. |
| 5,852,754 A | | 12/1998 | Schneider |
| 5,870,135 A | | 2/1999 | Glatt et al. |
| 5,878,156 A | | 3/1999 | Okumura |
| 5,923,364 A | * | 7/1999 | Rhodes et al. ............. 348/159 |
| 5,953,055 A | * | 9/1999 | Huang et al. ............... 348/155 |
| 5,982,418 A | * | 11/1999 | Ely ............................. 348/153 |
| 5,992,094 A | * | 11/1999 | Diaz ............................. 49/31 |
| 6,002,995 A | * | 12/1999 | Suzuki et al. ............... 702/188 |
| 6,035,067 A | | 3/2000 | Ponticos |
| 6,052,052 A | * | 4/2000 | Delmonaco ............ 340/539.11 |
| 6,088,468 A | * | 7/2000 | Ito et al. ..................... 382/103 |
| 6,097,429 A | * | 8/2000 | Seeley et al. ............... 348/154 |
| 6,285,394 B1 | * | 9/2001 | Huang ........................ 348/143 |
| 6,359,647 B1 | * | 3/2002 | Sengupta et al. ........... 348/154 |
| 6,469,734 B1 | * | 10/2002 | Nichani et al. ............. 348/152 |
| 6,654,481 B2 | * | 11/2003 | Amemiya et al. .......... 382/103 |
| 6,665,004 B1 | * | 12/2003 | Paff ............................ 348/156 |
| 6,720,874 B2 | * | 4/2004 | Fufido et al. ............... 340/541 |

FOREIGN PATENT DOCUMENTS

| | | |
|---|---|---|
| DE | 1168269 A2 | 5/2001 |
| DE | 10026710 A | 12/2001 |
| EP | 0610863 A1 | 8/1994 |
| EP | 0654684 A2 | 5/1995 |
| EP | 0468839 B1 | 9/1995 |
| EP | 0691632 A1 | 1/1996 |
| EP | 0491121 B1 | 2/1996 |
| EP | 0519379 B1 | 9/1996 |
| EP | 0554197 B1 | 10/1996 |
| EP | 0484076 B1 | 12/1996 |
| EP | 0529317 B1 | 12/1996 |
| EP | 0772169 A2 | 5/1997 |
| EP | 0774730 A2 | 5/1997 |
| EP | 0800152 A1 | 10/1997 |
| EP | 0810791 A2 | 12/1997 |
| EP | 0585033 B1 | 1/1998 |
| EP | 0575220 B1 | 3/1998 |
| EP | 0632858 B1 | 8/1998 |
| EP | 0691632 B1 | 10/1998 |
| EP | 1037181 A | 9/2000 |
| JP | 07056219 | 8/1993 |
| JP | 07104362 | 10/1993 |
| JP | 07159892 | 12/1993 |
| JP | 07175128 | 12/1993 |
| JP | 07191390 | 12/1993 |
| JP | 07222039 | 1/1994 |
| JP | 07255004 | 3/1994 |
| JP | 07281276 | 4/1994 |
| JP | 08076213 | 9/1994 |
| JP | 08140941 | 11/1994 |
| JP | 09083999 | 9/1995 |
| JP | 09193078 | 1/1996 |
| JP | 10031256 | 7/1996 |
| JP | 10042231 | 7/1996 |
| WO | WO 84/03784 | 9/1984 |
| WO | WO 97/01246 | 1/1997 |
| WO | WO 97/05741 | 2/1997 |
| WO | WO 97/05744 | 2/1997 |
| WO | WO 97/12278 | 4/1997 |
| WO | WO 98/18026 | 4/1998 |
| WO | WO 98/46116 | 10/1998 |
| WO | WO 98/47025 | 10/1998 |

OTHER PUBLICATIONS

Aach, T., et al., "Statistical Model-Based Change Detection in Moving Video," Signal Processing, vol. 31, No. 2, pp. 165-180, Mar. 1993.

Weszka, J.S., "SURVEY: A Survey of Threshold Selection Techniques," Computer Graphics and Image Processing 7, vol. 7, No. 2, pp. 259-265, Apr. 1978.

Ostermann, J., "Modeling of 3D Moving Objects For An Analysis-Synthesis Coder," SPIE-SPSE: Symposium on Sensing and Reconstruction of 3D Objects and Scenes, Proc. SPIE 1260, pp. 240-249, Santa Clara, CA., Feb. 1990.

Xiong, W., et al., "Efficient Scene Change Detection and Camera Motion Annotation, for Video Classification," Computer Vision and Image Understanding, vol. 71, No. 2, pp. 166-181, Aug. 1998.

Skifstad, K., et al., "Illumination Independent Change Detection for Real World Image Sequences," Computer Vision, Graphics, and Image Processing, vol., 46, No. 3, pp. 387-399, Jun. 1989.

Vekatsheh, S., "Dynamic Threshold Determination by Local and Global Edge Evaluation," Graphical Models and Image Processing, vol. 57, No. 2, pp. 146-160, Mar. 1995.

Ostermann, J., "Segmentation of Image Areas Changed Due to Object Motion Considering Shadows," Multimedia Communications and Video Coding, pp. 241-246, Y. Wang, Ed., New York: Plenum, 1996.

Stauder, J., Segmentation of Moving Objects in Presence of Moving Shadows: Proc. Int. Workshop on Coding Techniques for Very Low Bit Rate Video, Linkoping, Sweden, Jul. 28-30, 1997, pp. 41-44.

Hotter, M., et al., "Image Segmentation Based on Object Oriented Mapping Parameter Estimation", Signal Processing, vol. 15, No. 3, pp. 315-334, Oct. 1988.

U.S. Appl. No. 09/716,002, filed Nov. 17, 2000, entitled, "Object Detection.".

U.S. Appl. No. 60/275,879, filed Mar. 14, 2001, entitled, "Safety Camera.".

\* cited by examiner

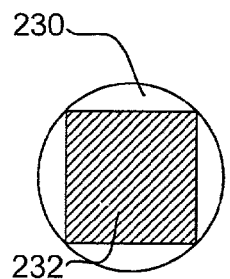
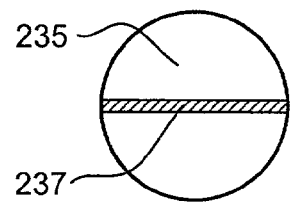
FIG. 7B    FIG. 7C
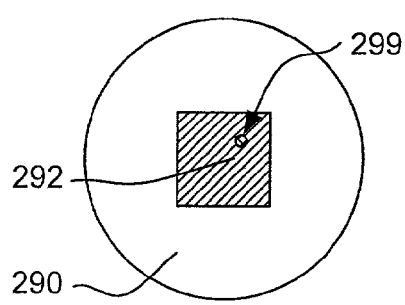
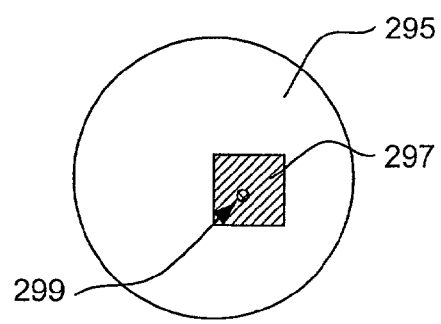
FIG. 8B    FIG. 8C

OBJECT DETECTION

This application is a Continuation-in-Part of U.S. patent application Ser. No. 09/716,002, filed Nov. 17, 2000 now U.S. Pat. No. 6,711,279, entitled "OBJECT DETECTION", which is incorporated herein by reference. This application also claims priority under 35 U.S.C.§119(e)(1) to now abandoned U.S. Provisional Patent Application Ser. No. 60/275,879, filed Mar. 14, 2001, and entitled "SAFETY CAMERA".

FIELD OF THE INVENTION

The present invention relates to object detection, and more specifically, to object intrusion and/or presence detection within a predefined area or region.

BACKGROUND OF THE INVENTION

Electrosensitive Protective Equipment (ESPE) is well-known and widely used in industrial settings to protect operators of hazardous equipment from injury. ESPE devices typically have a sensing function, a control or monitoring function, and an output signal switching function. The sensing function typically collects data from, for example, a defined safety zone surrounding dangerous equipment. The safety zone may be a line, an area, or a volume, depending on the sensing technology used. The control function monitors the sensing function. When the control function determines that the sensor data provided by the sensing function corresponds to an intrusion into the safety zone, an output signal is produced to sound an alarm, deactivate the hazardous equipment, or perform some other precautionary measure.

A variety of ESPE devices are currently commercially available, including single beam photodetectors, light curtains, laser scanners, safety mats and others. Single beam photodetectors typically use a single light source and light detector to provide some level of access monitoring. When an object moves between the light source and the light detector, the light beam extending therebetween is interrupted, which then triggers a safety violation. A limitation of single beam photodetector systems is that only limited access control and typically no presence sensing is provided. Another limitation is that to change the location, shape or size of the safety zone, the light source and/or light detector must typically be physically moved.

Light curtain systems are similar to single beam photodetector systems, except a linear array of light emitter/light detector pairs are provided. The light emitter/light detector pairs are mounted in a pair of spaced enclosures. The array of light emitters produce a "light curtain" that extends to the corresponding light detectors. When the light curtain is interrupted by an object, a safety violation is triggered. The resolution (size of object detected) typically depends on the spacing of the light beams. Light curtain systems can provide some level of access control when mounted vertically, and some level of presence monitoring when mounted horizontally. However, a limitation of some light curtain systems is that they are relatively expensive and complex. Another limitation is that variations in the size and shape of the safety area may be restricted, and the spaced enclosures must typically be physically moved to change the configuration of the safety zone to be monitored.

Laser scanner system typically include a rotating laser emitter/detector, which scans a plane and measures the distance to the nearest object in any direction by monitoring the reflection of the beam. This type of device can provide some level of presence monitoring along a horizontal plane. It may also be mounted vertically to provide some level of access monitoring, similar to the light curtain systems discussed above. A limitation of laser scanner systems is that they use complex mechanical components, such as rotating heads, which can requiring periodic and precise alignment. While the region to be monitored may be redefined using configuration software, its shape is often limited by the line-of-sight of the laser. Also, the response time is limited by the need to rotate the laser beam, and the sensitivity may be limited by air pollution in an industrial environment.

Finally, safety mat systems have been used to provide presence monitoring by detecting physical contact with a floor mat/sensor. Its robustness is limited by the need for physical contact with the floor mat for detection, which can be problematic in the often harsh environment of the factory floor. Safety mat systems typically cannot monitor large areas unless a number of mats are connected together. Finally, and like the single beam photodetector and light curtain systems described above, the safety mats must typically be physically moved to change the configuration of the safety zone to be monitored.

SUMMARY OF THE INVENTION

The present invention provides a visual object detection system that uses one or more images from a video camera, digital camera, etc., to provide access and/or presence monitoring of an area of interest. In steady state operation, that is when no object is entering or within the area of interest, only those portions of the incoming images that correspond to the border of the area of interest are analyzed. By only monitoring the border area, the present invention may quickly detect when the border has been breached by an object. After the border is breached, the present invention preferably sounds an alarm, deactivates hazardous equipment in the area of interest, or performs some other precautionary measure, but this is not required.

Once the border is breached by an object, the present invention may begin analyzing the entire area or selected regions inside the border of the area of interest. This may provide some level of presence monitoring of the area of interest. In some embodiments, the presence monitoring can be performed at a slower rate than the border analysis, particularly when one or more precautionary measures have already been initiated by a border breach. It is contemplated that both modes of analysis can take place simultaneously or sequentially, depending on the application. Once the object leaves the area of interest, the present invention preferably returns to the original steady state, and monitors only the border regions of the incoming images.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 7B is a diagram showing the field of view of the overhead camera of FIG. 7A;

FIG. 7C is a diagram showing the field of view of the side camera of FIG. 7A;

FIG. 8B is a diagram showing the field of view of the overhead camera of FIG. 8A;

FIG. 8C is a diagram showing the field of view of the side camera of FIG. 8A;

DETAILED DESCRIPTION OF THE DRAWINGS

Figure 1:
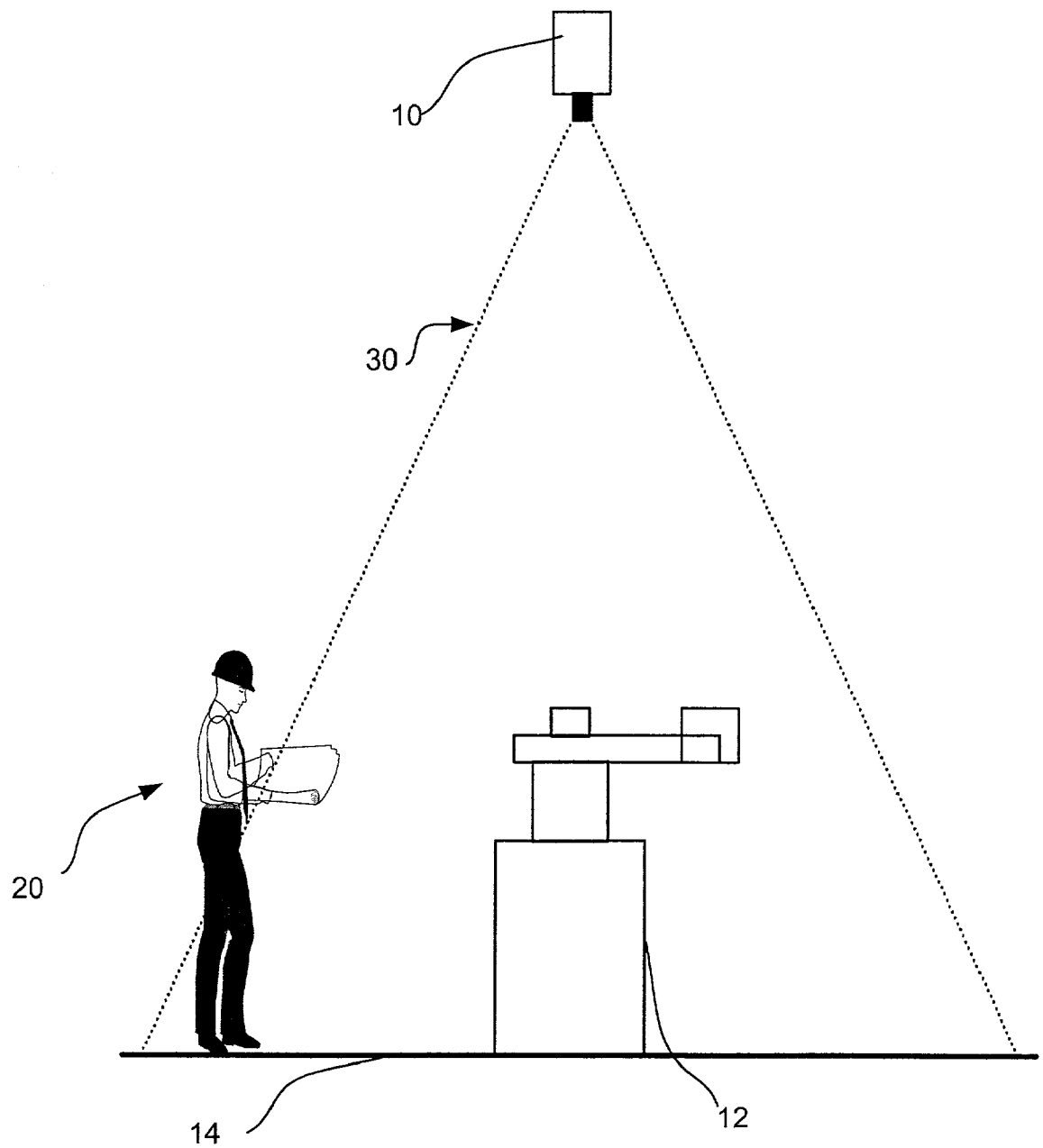
FIG. 1 is a partial side view of a workplace area with an overhead safety camera in place.

FIG. 1 is a side view of a workplace area 14 with a camera 10. In the illustrative embodiment, camera 10 is placed over equipment 12, which is surrounded by a safety area 14. The equipment 12 may be a piece of hazardous equipment, for example a machine with moving parts, a chemical storage unit, a raw materials processor, an incinerator, or any other machine that could present a danger to a person. Likewise, the equipment 12 may be one or more pieces of equipment that are performing highly sensitive activities, where a safety system could be used to prevent an object or a person from interfering with the highly sensitive activity. Also, equipment 12 may be a valuable item, and a safety system could be implemented to prevent the item from being taken or damaged. A worker 20 is shown standing in the safety area 14. In the illustrative embodiment, the camera 10 gathers frames along a pyramid 30 shaped field of view, preferably as a two dimensional image.

Figure 2:
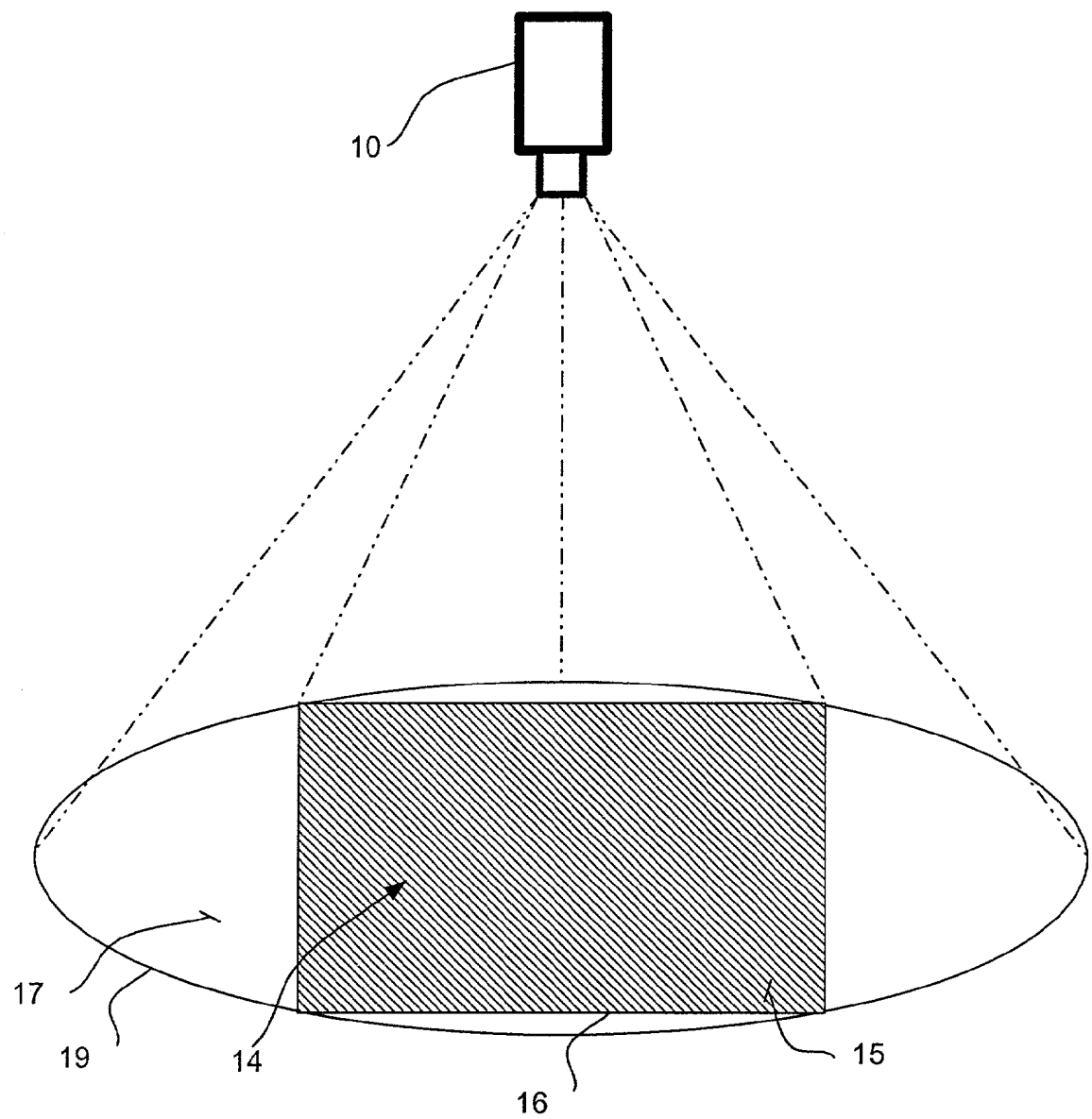
FIG. 2 is a perspective view of a safety camera having a field of view, with an area of interest within the field of view of the safety camera.

FIG. 2 is a schematic view of a camera 10 having a field of view 19. An area of interest 14 is shown in cross-hatch. It should be noted that the term "area" is not limited to a two-dimensional area, and may include three-dimensional volumes, as further described below. The present invention preferably uses a digital camera 10 or the like to gather images along the field of view 19 of the camera 10. After gathering an image along of the field of view 19 of the camera 10, data processing techniques are preferably used to select those pixels that fall within the border 16. The present invention also preferably distinguishes between those pixels that fall along the border 16 and those pixels that fall within the border 16.

In one illustrative embodiment, when no object is entering or within the area of interest 14, only those pixels of the incoming images that correspond to the border 16 of the area of interest are analyzed. By only monitoring those pixels along the border area 16, the present invention may quickly detect when the border 16 has been breached by an object. After the border is breached, a precautionary measure may be taken, such as sounding an alarm, deactivating hazardous equipment in the area of interest 17, or performing some other precautionary measure, but this is not required.

Once the border is breached by an object, the illustrative embodiment may begin analyzing those pixels within the interior 15 of the area of interest 14. This may provide some level of presence monitoring of the interior 15 of the area of interest 14. In some embodiments, the presence monitoring can be performed at a slower rate than the border analysis, particularly when one or more precautionary measures have already been initiated by a border breach. It is contemplated that both modes of analysis can take place simultaneously or sequentially, depending on the application. Once the object leaves the area of interest 15, the present invention may return to the original steady state, and monitor only those pixels in the border region 16 of the incoming images.

Figure 3:
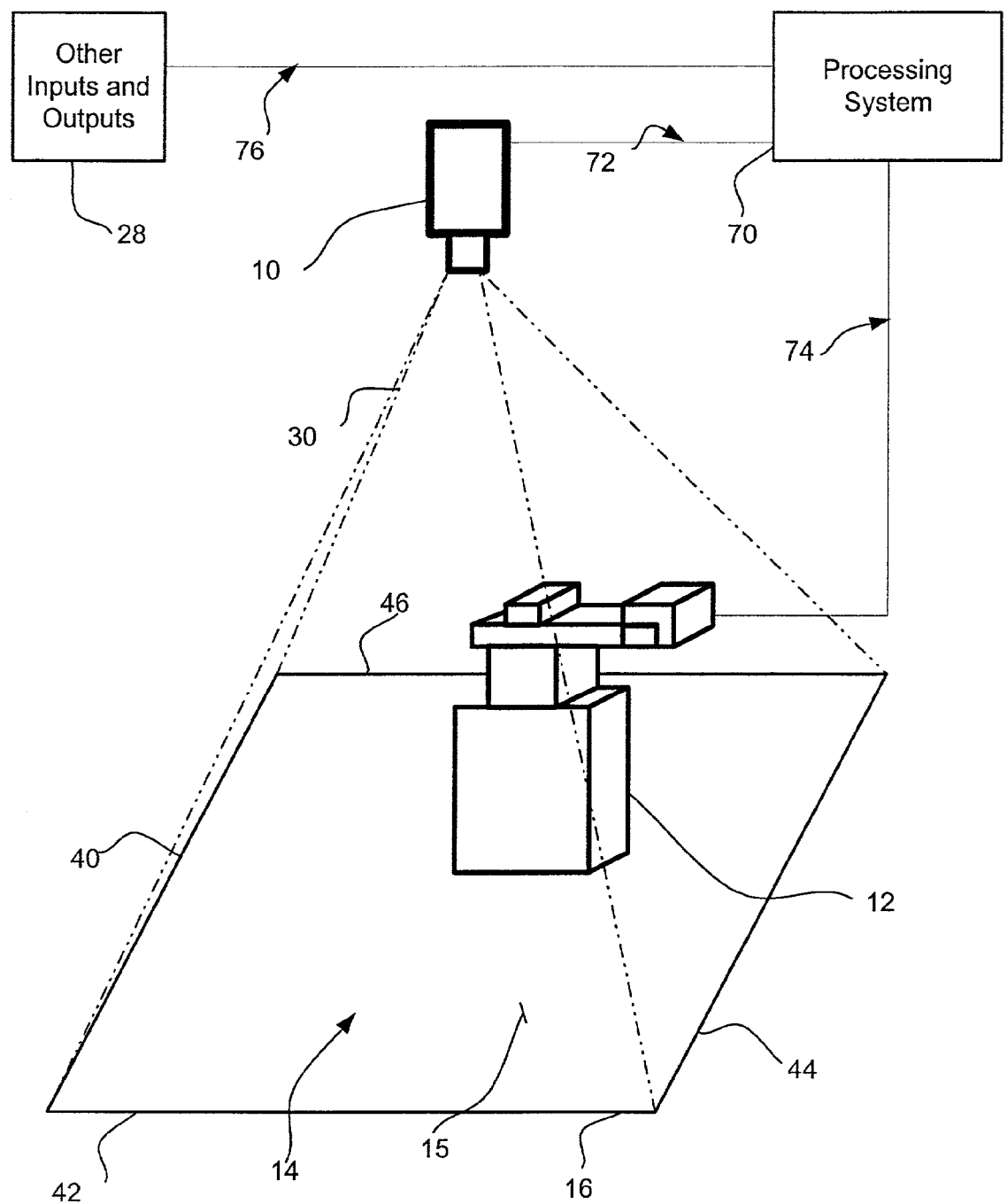
FIG. 3 is a schematic diagram showing a workplace with safety system in place.

FIG. 3 is a schematic diagram showing a workplace with safety system in place. In the illustrative embodiment, a safety camera 10 is disposed above the workplace area. The workplace area preferably has a predefined region of interest 14, which may correspond to a safety zone around a piece of equipment 12. The interior area 15 of the area of interest 14 is defined by a border 16, which in the illustrative embodiment, has sides 40, 42, 44, 46.

A processing system 70 is shown connected to the safety camera 10 via interface 72. Processing system 70 preferably processes images received from safety camera 10 to determine if an object has breached a predefined border region 16 and/or if an object remains within the area of interest 15, as described above. The processing system 70 may also be connected to equipment 12, via interface 74. When the processing system 70 determines that the border region 16 has been breached, the processing system may send an enable or turn-off signal to the equipment 12 via interface 74. This enable or turn-off signal preferably causes the equipment 12 to turn off, trigger a brake, or otherwise stop the operation of equipment 12. Alternatively, or in addition, processing system 70 may receive information from equipment 12, such as a warning, an error or a malfunction signal, if desired.

In the illustrative embodiment, the processing system 70 is also connected to other input or output devices 28 via an interface 76. The input or output devices 28 may include, for example, an audible alarm, a visible alarm, a transmitter to send a warning signal to a remote location, a memory device to keep records of warning signals, etc.

Figure 4A:
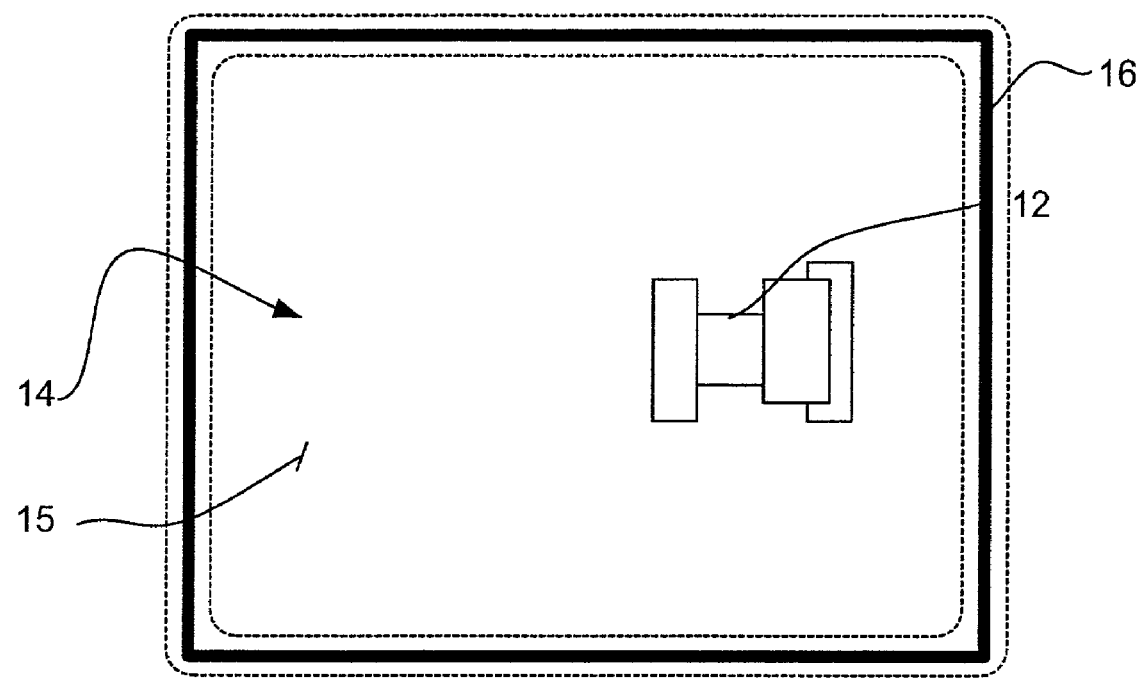
FIGS. 4A is a diagram of an image of an area of interest with a border region defined.

FIGS. 4A is a diagram of an image of an area of interest 14 with a border region 16 defined. A piece of equipment 12 is shown within the interior area 15. In the illustrative embodiment, the image is divided into a border region 16 and an interior region 15. Border 16 may be more narrowly or more widely defined, depending on the application. In a preferred embodiment, only the border 16 is analyzed during steady state operation, and analysis of the interior region 15 only takes place after a triggering event, such as the breach of the border region 16. Alternatively, or in addition, analysis of the interior region 15 may be initiated by other mechanisms, such as at timed intervals, in response to an external stimulus, such as a manual request of interior region analysis, etc.

In some embodiments, a pattern may be provided on the floor, preferably corresponding to the desired border region 16. In one example, a patterned tape or painted strip with contrasting dark and light areas may be placed along the desired border region 16. The area defined by each of the contrasting color regions may be chosen to correspond to the minimum size of the object to be detected. It is contemplated, however, that any number of patterns may be used including, for example, a single color line, a checked pattern, crisscrossing stripes, etc. In addition, the pattern may cover a more general area, and need not be confined to the border 16.

Algorithms and designs for detecting objects using a patterned area can be found in co-pending U.S. patent application Ser. No. H16-26483, entitled "OBJECT DETECTION", which is incorporated herein by reference. Preferably, objects are detected in the border region 16 using the algorithms described in co-pending U.S. patent application Ser. No. H16-26483, entitled "OBJECT DETECTION". Several embodiments use an analysis in which individual or groups of pixels are compared to one or more reference images. Comparison is preferably made on the basis of some identifiable or quantifiable property, such as luminance, color, tint, hue, spectra, etc., of the pixel or group of pixels being analyzed.

Markers may also be included in the area of interest 14 to enable functioning of a system in which the relative position of the camera with respect to the area of interest cannot or will not be maintained during operation of the safety system. In environments where there are complicated operations, additional equipment or space constraints, or any other need to move the camera in relation to the area of interest 14, a marker or the like may be used to provide a point or reference. In some industrial settings, vibrations may cause noticeable movement of the camera. A suitable marker may be any of several known in the art such as colored or painted dots, strips, sound or light signal generators, identifiable shapes or designs, etc.

Figure 4B:
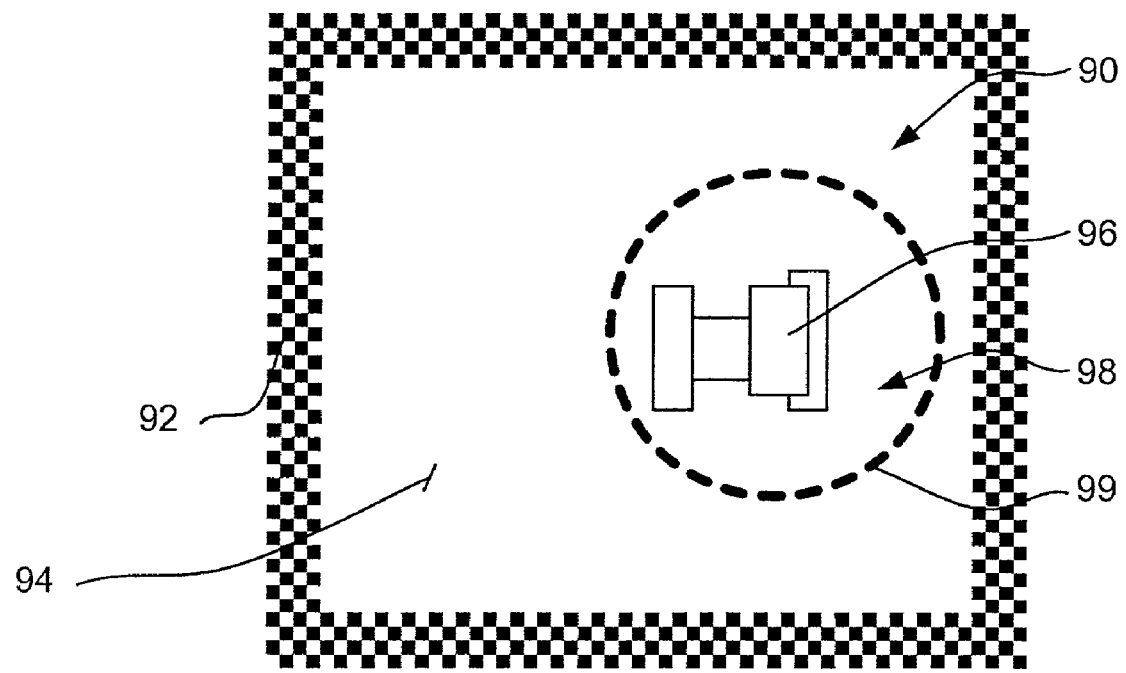
FIG. 4B is a diagram of an image of an area of interest, wherein the floor of the area of interest has a pattern along the border region.

FIG. 4B is a diagram of an image of an area of interest, wherein the floor of the area of interest has a pattern along the border region. Area of interest 90 is defined by an outside border 92 and an interior region 94. As discussed above, outside border 92 may include a pattern, such as a checker pattern. Such a pattern is not required in the present invention, but may be useful to improve the accuracy and/or speed of the border analysis. Such a pattern may be provided throughout the area of interest 90, if desired. In addition, and in some embodiments, a different pattern may be used in the border region 92 than in the interior region 94.

Equipment 96 is shown within an excluded area 98, which is defined by internal border 99. In one illustrative embodiment, movement across outside border 92 and internal border 99 may be monitored during steady state operation. If an object crosses into one of these areas, the interior region 94 (excluded area 98) may then be monitored. In one embodiment, the excluded area 98 may be used to detect objects that are thrown or otherwise are moving away from equipment 96 during steady state operation. Such objects may indicate failure or malfunction of the piece of equipment 96. It is contemplated that equipment 96 may not be within excluded area 98, or may be part in excluded area 98 and part in interior region 94, or may be entirely inside excluded area 98. Selection of the border of excluded area 98 may include assessing whether the equipment 96 has moving parts that could disrupt the safety system if not ignored.

Figure 5:
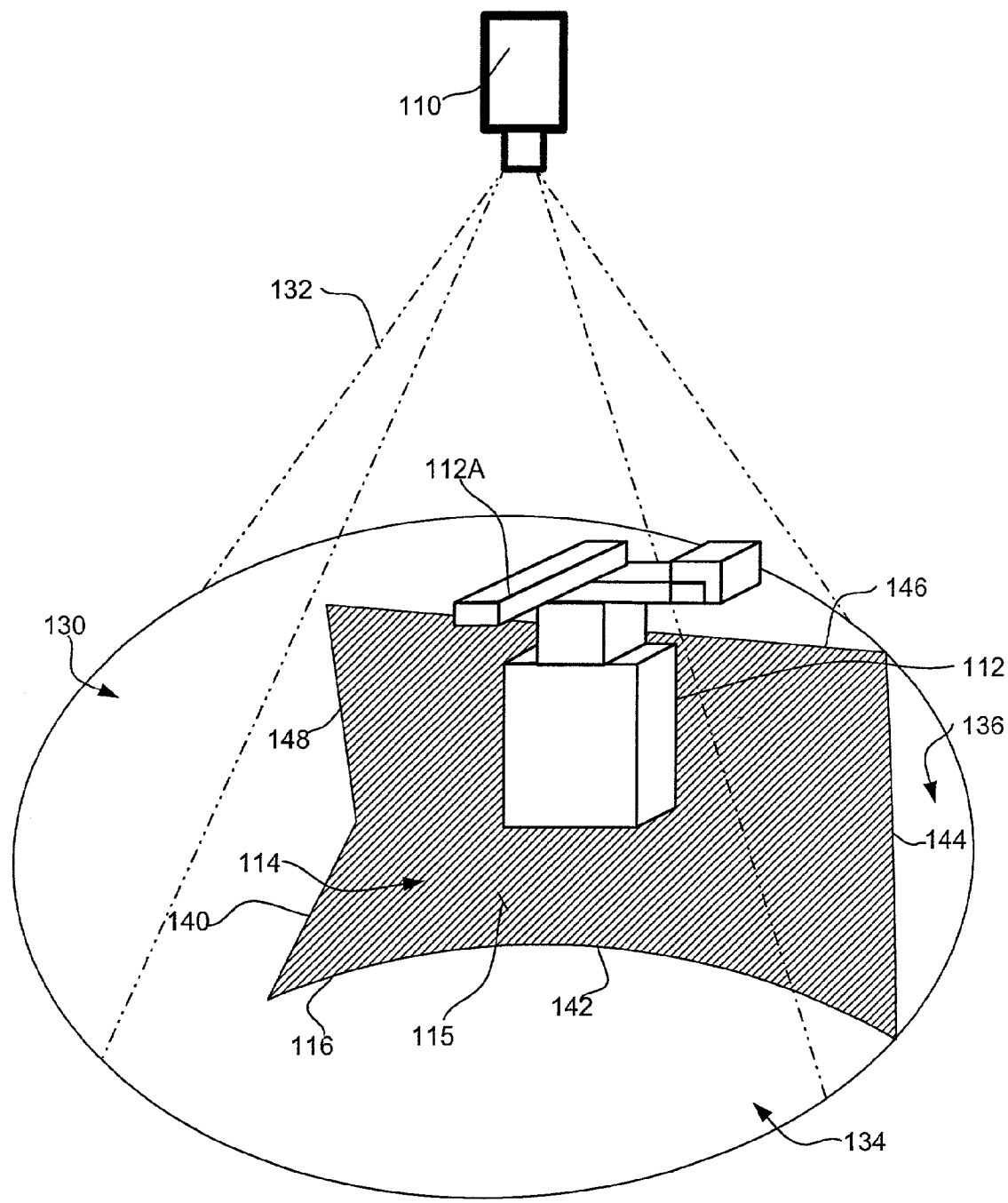
FIG. 5 is a perspective view of a safety camera system that monitors an area of interest having irregular shaped borders.

FIG. 5 is a perspective view of a safety camera system that monitors an area of interest having irregular shaped borders. Camera 110 is disposed above an area of interest 114 with an interior region 115 and a border region 116. Equipment 112 is located inside area of interest 114. Border 116 is irregular in shape, made up of segments 140, 142, 144, 146 and 148, with 142 being curved. Camera 110 gathers an image including a larger field of view 130 defined under cone 132. A processing unit (not shown) may then exclude pixels that correspond to areas 134 and 136 from analysis. In a preferred embodiment, a user can select the dimensions and shape of the area interest 114, as desired.

Also shown in FIG. 5 is that the camera 110 need not be centered over the desired area of interest 114. Offsetting the camera 110 may be desirable for a variety of reasons including space constraints, etc. In addition, and supposing equipment 112 includes a part 112A that is of particular interest, the camera 110 may be disposed in an off-center fashion relative to the area of interest 114 to provide a better view of the part 112A.

Figure 6A:
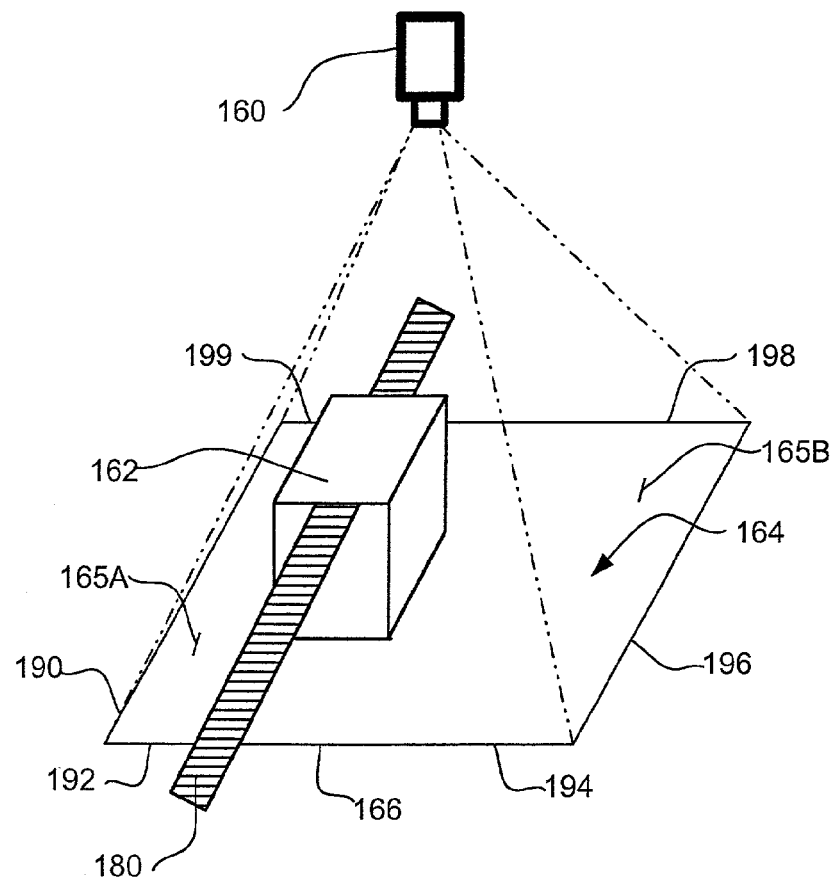
FIGS. 6A is a perspective view of an area of interest with breaks in the border.

FIG. 6A is a perspective view of an area of interest with breaks in the border. Camera 160 is disposed above the area of interest 164. The area of interest 164 is divided into two interior regions 165A and 165B. The interior regions 165A and 164B are separated by conveyer belt 180 and machine 162. The border region 166 is defined by lines 194, 196, 198, and lines 190, 192, 199. The conveyer belt 180 crosses the border 166 as shown. In a preferred embodiment, movement along the conveyer belt 180 does not trigger the safety system, while movement across border lines 190, 192, 194, 196, 198, 199 does.

Figure 6B:
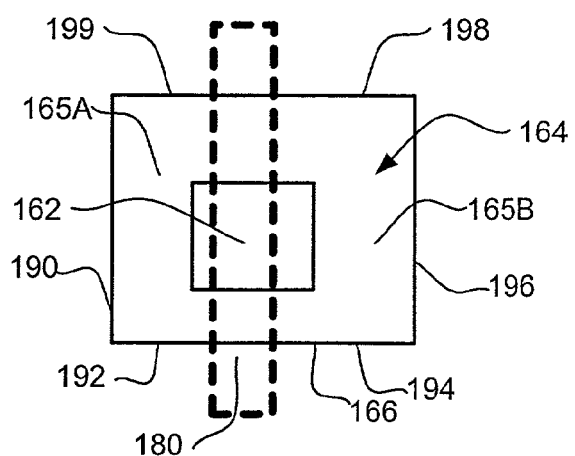
FIGS. 6B is a top view of the area of interest of FIG. 6A.

FIG. 6B is a top view of the area of interest of FIG. 6A. Conveyer belt 180 crosses the area of interest 164, splitting the interior area into internal areas 165A and 165B, thereby making the border region 166 non-continuous. The border 166 is made up of several segments 190, 192, 194, 196, 198, 199, as described above. Equipment 162 connects to the conveyer belt 180. In one embodiment, movement in the area covered by the conveyer belt 180 is ignored, such that steady state analysis would monitor the border segments 190, 192, 194, 196, 198, 199 not covered by the conveyer belt 180. In another embodiment, interior analysis would ignore the area covered by the conveyer belt 180 and would only analyze areas 165A and 165B. The interior analysis may or may not analyze the area over the equipment 162.

As shown by FIGS. 6A and 6B, there are two interior zones 165A and 165B that are monitored by a single camera 160. It is contemplated that a similar approach may be used to monitor two or more separate and/or unrelated safety zones using a single camera. For example, each interior zone 165A and 165B could contain or surround separate and/or unrelated equipment, assuming each safety zone is in the field of view of the camera. This may reduce the cost of providing the safety camera system. In addition, and depending on the application, each zone may be monitored differently. For example, in a "LOAD MACHINE" mode, only interior region 165B may be monitored, while interior region 165A may not be monitored. In a "RUN" mode, both interior regions 165A and 165B may be monitored. This is just one illustration.

Figure 7A:
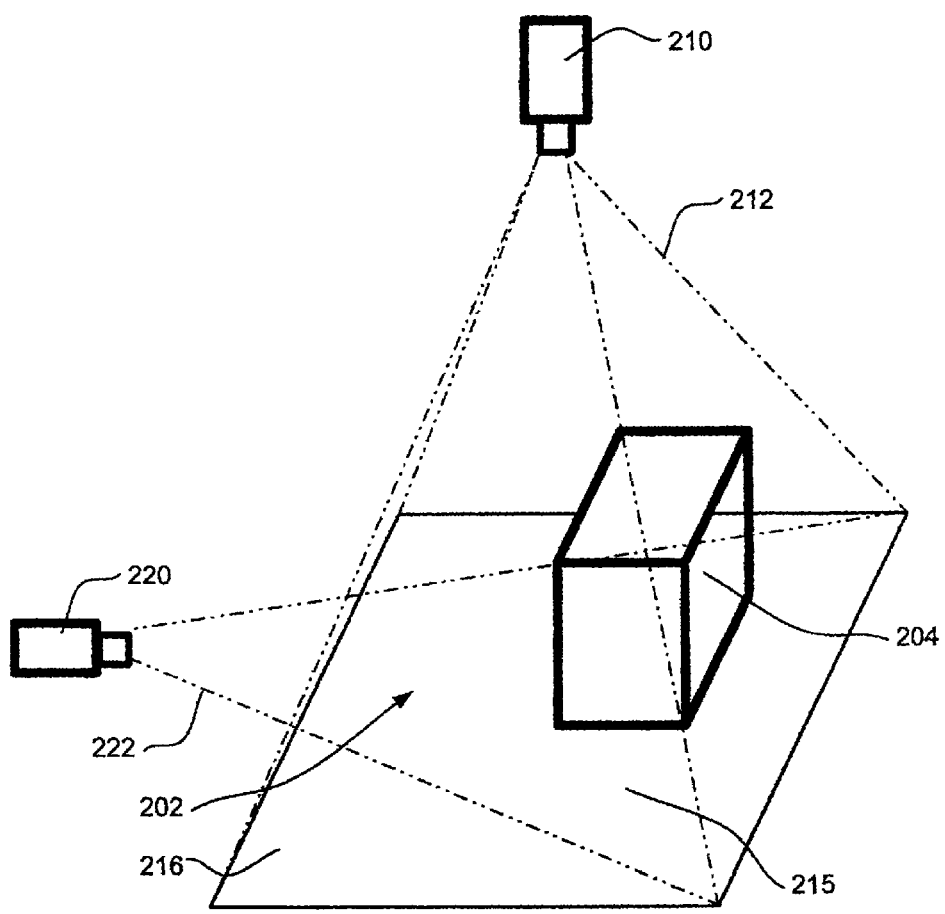
FIGS. 7A is perspective view of a safety camera system having an overhead camera and a side camera for monitoring the area of interest.

FIG. 7A is perspective view of a safety camera system having an overhead camera 210 and a side camera 220 for monitoring an area of interest 202. The overhead camera may monitor, for example, horizontal movement in the area of interest, as described above. In contrast, the side camera 220 may monitor, for example, vertical movement within the area of interest 202. It is contemplated that a pattern may be applied to a wall or the like in the field of view of the side camera to help detect movement of objects within the area of interest.

Further illustration of the camera operations for the illustrative embodiment of FIG. 7A appears in FIGS. 7B and 7C. FIG. 7B is a diagram showing a possible field of view for the overhead camera 210, and shows an area of interest 232. FIG. 7C is a diagram of an illustrative field of view for the side camera 220. The side camera 220 may, for example, monitor vertical movement across a predefined plane. In this illustrative embodiment, the field of view 235 of the side camera 220 has a thin selected area 237 that corresponds to the desired plane.

Figure 8A:
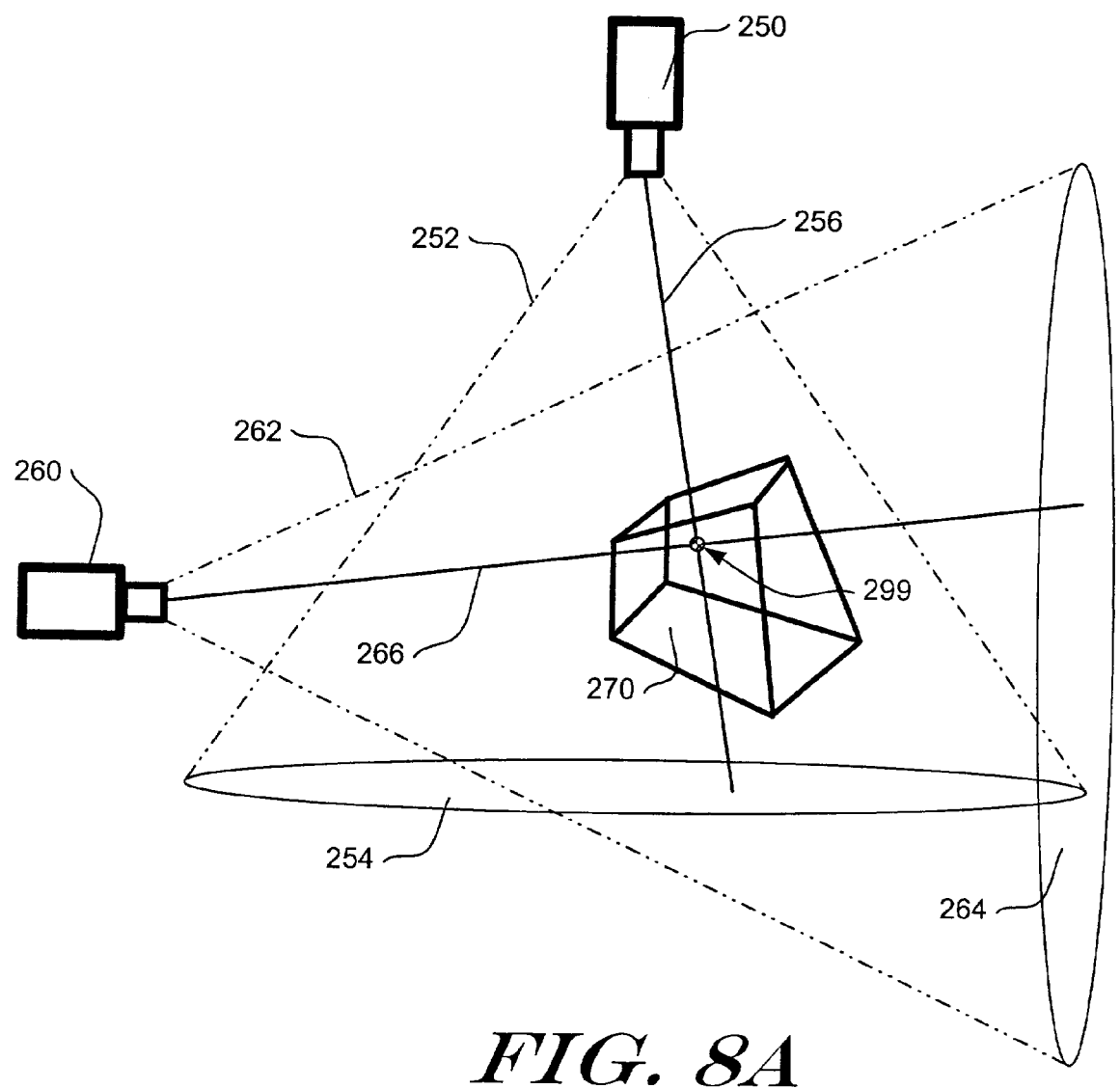
FIG. 8A is a perspective view of another safety camera system having two safety cameras for monitoring a volume of interest.

FIG. 8A is a perspective view of another safety camera system having two safety cameras 250 and 260 for monitoring a volume of interest 270. In the illustrative embodiment, a first camera 250 is positioned to capture an image under a cone 252 defining a circle 254 along the horizontal plane, while a second camera 260 is disposed to capture an image under a cone 262 defining circle 264 in the vertical plane.

FIG. 8B is a diagram showing the field of view 290 of the first camera 250 of FIG. 8A, with a first selected area of interest 292. FIG. 8C is a diagram showing the field of view 295 of the second camera of FIG. 8A, with a second selected area of interest 297. In the illustrative example, volume 270 is a six-sided volume, whose shape is defined by the selected areas 292, 297, and the shape of cones 252, 262. The shape of the volume of interest 270 may be refined by using additional cameras, or by using improved cameras that may capture additional information within the corresponding field of view. Additional optical devices may also be used for the shaping of the volume of interest 270.

In FIG. 8A, an object 299 is shown within volume of interest 270. The object 299 lies along a first line 256 corresponding to camera 250, and a second line 266 corresponding to camera 260. FIG. 8B shows that the object 299 can be found in a selected area 292, and FIG. 8C shows that the object can be found in selected area 297. Because the object 299 appears in both selected areas 292 and 297, the object lies within volume of interest 270. When the object is at a boundary of either of the selected areas 292 or 297, the object is at the boundary of the volume of interest 270.

In one illustrative embodiment, when no object is entering or within the volume of interest 270, only those portions of the incoming images that correspond to the border of the volume of interest 270 may be analyzed. By only monitoring the border area, the present invention may quickly detect when the border has been breached by an object. After the border is breached, the present invention may, for example, sound an alarm, deactivate hazardous equipment in the volume of interest, or perform some other precautionary measure, but this is not required.

Once the border is breached by an object, the present invention may begin analyzing the entire volume or selected regions inside the volume of the area of interest, as desired. This may provide some level of presence monitoring of the volume of interest. In some embodiments, the presence monitoring can be performed at a slower rate than the border analysis, particularly when one or more precautionary measures have already been initiated by a border breach. It is contemplated that both modes of analysis can take place simultaneously or sequentially, depending on the application. Once the object leaves the volume of interest, the present invention preferably returns to the original steady state, and monitors only the border regions of the incoming images.

Figure 9:
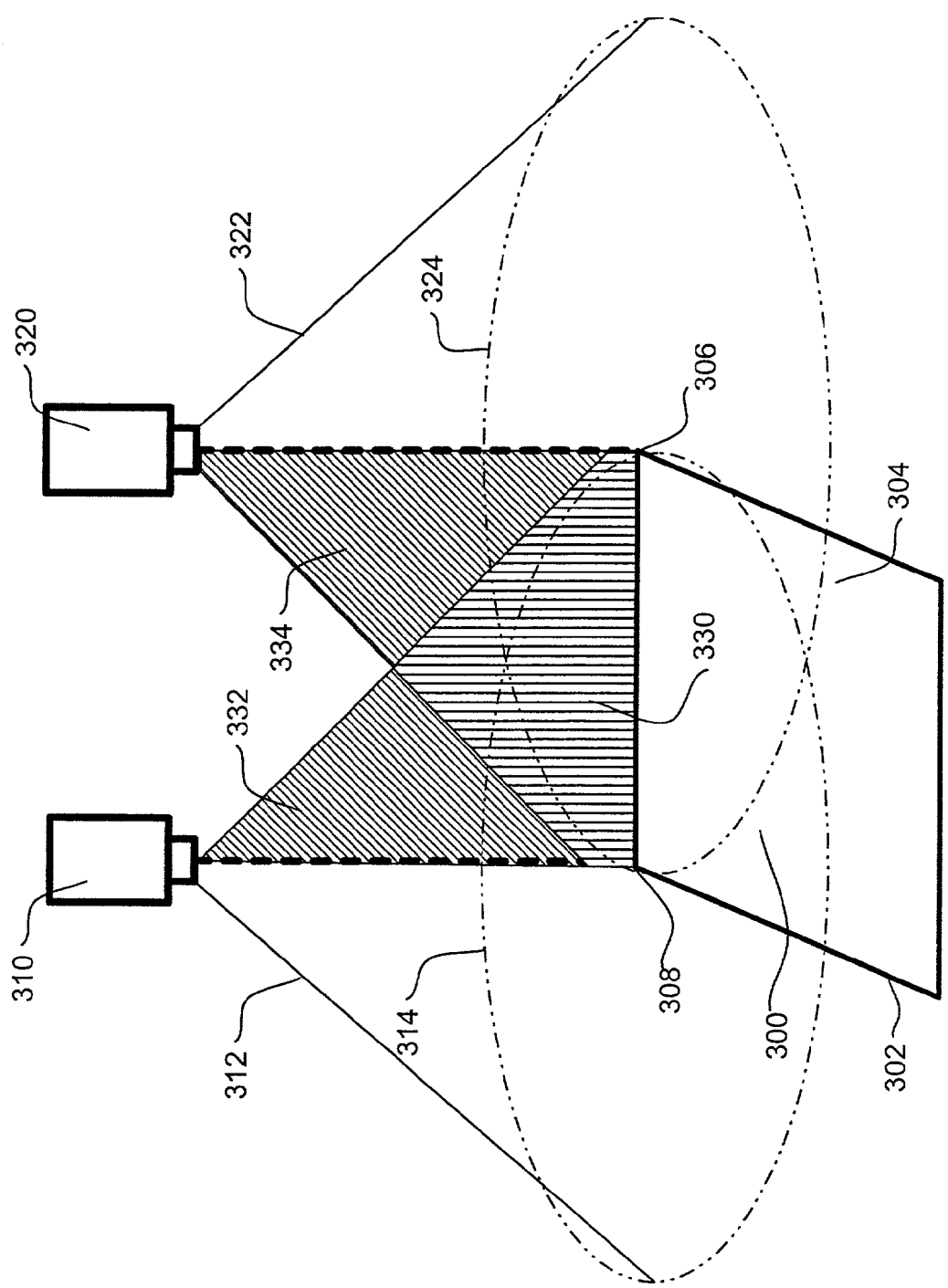
FIG. 9 is a perspective view of yet another safety camera system having two safety cameras for monitoring an area of interest.

FIG. 9 is a perspective view of yet another safety camera system having two safety cameras for monitoring an area of interest. In this illustrative embodiment, the area of interest is shown at 300, and is defined by border 302. Corners 306 and 308 are also shown, with cameras 310 and 320 disposed over the corners. A first camera 310 captures images under a cone 312, defined by field of view 314. A second camera 320 likewise captures images under a cone 322, defined by field of view 324. A planar border defined by a polygon 330 and two triangles 332 and 334 can then be defined. The shape and center height of the polygon 330 may be changed by adjusting the angles of cameras 310 and 320 with respect to the area of interest 300, by utilizing different cameras 310 and 320, by adding additional cameras, etc. If so desired, the border may be defined as only including the area within the polygon 330, which would thus monitor an area captured only by both cameras 310 and 320. Once the border is defined, the present invention preferably monitors the border for breach by an object. Once breached, the present invention preferably begins analyzing the entire area or selected regions of the area of interest 300, as described above.

As is shown in FIGS. 1–9, there are a variety of configurations that may be used to detect a border breach and/or monitor an area of interest. Many other configurations are also possible. Data selection and exclusion, along with placement of multiple cameras, manipulation of angles of a single or multiple cameras, and other embodiments may be used to monitor borders, areas, and volumes of many shapes, sizes, configurations, and numbers, as desired.

Figure 10A:
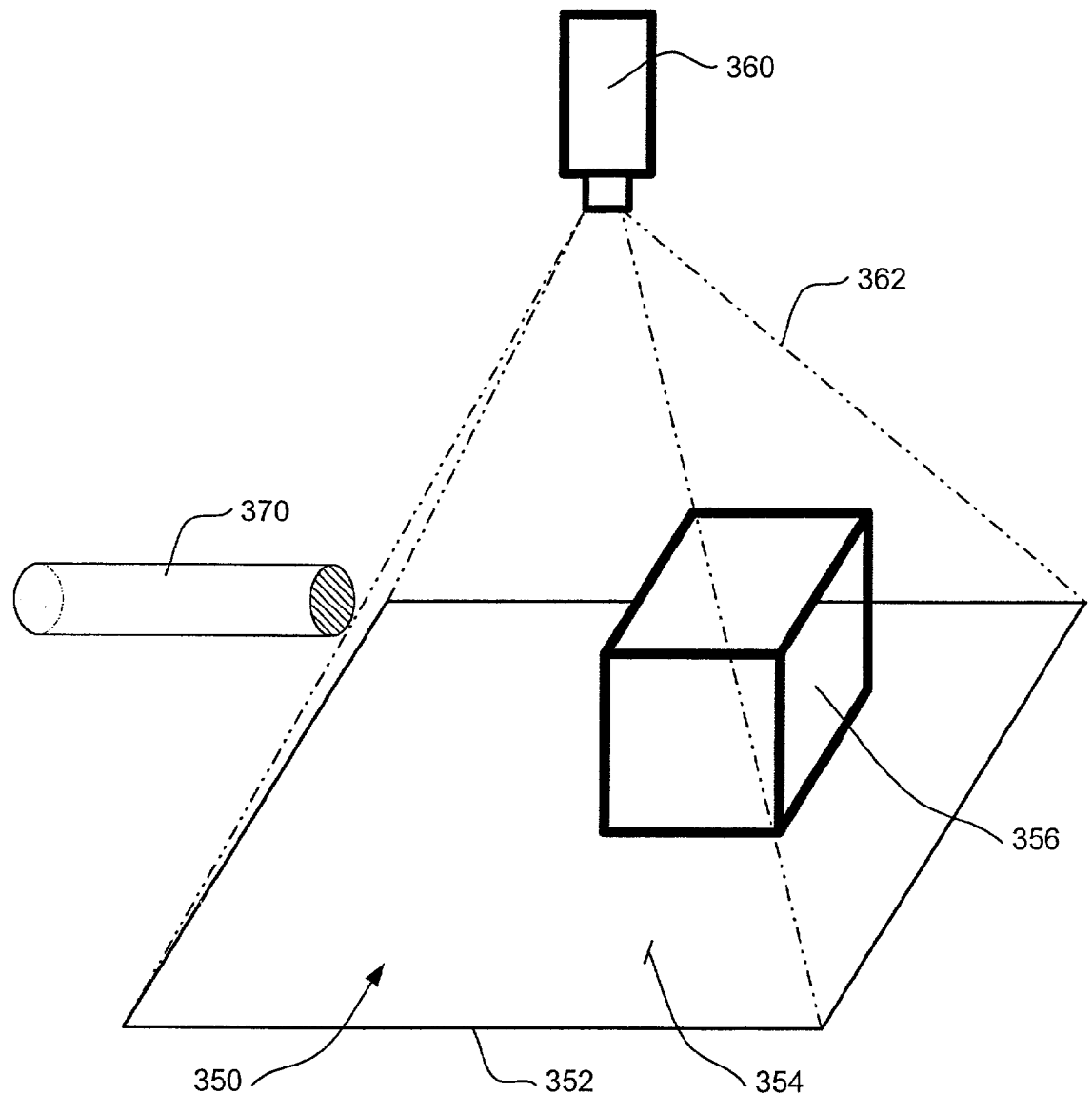
FIG. 10A is a perspective view of an area of interest with an object just entering the border of the area of interest.
Figure 10B:
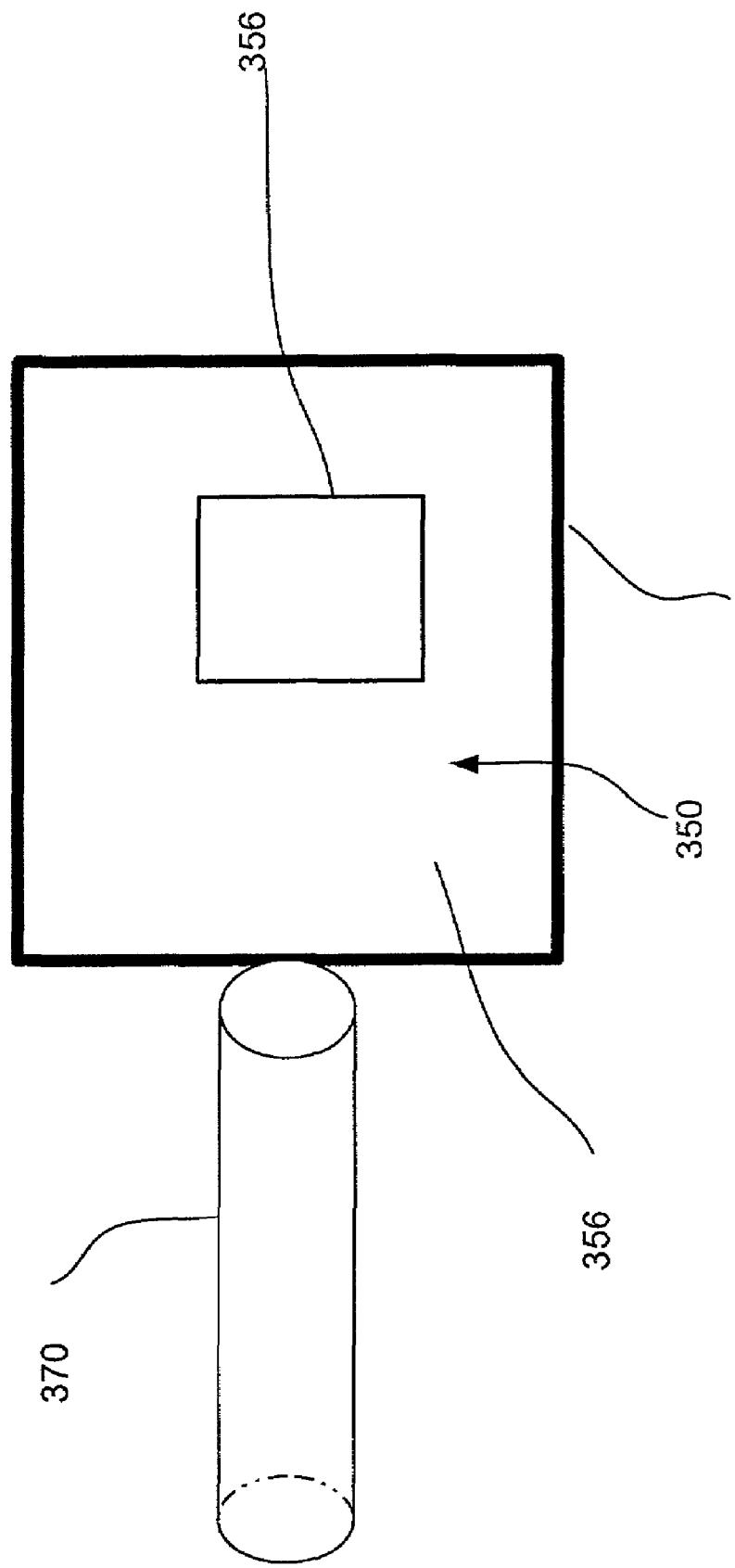
FIG. 10B is an overhead view of the area of interest and the object of FIG. 10A.

FIG. 10A is a perspective view of an area of interest 350 with an object 370 just entering the border 352 of the area of interest 350. Equipment 356 is in the area of interest 350, and the object 370 is shown just at the border 352 of a pyramid 362 outlining a selected area within the field of view of a camera 360. No other object is observed in the interior 354 of the area of interest 350. FIG. 10B is an overhead view of the area of interest 350 and the object 370 of FIG. 10A.

In steady state operation, that is when no object is entering or within the area of interest, only those portions of the incoming images that correspond to the border 352 of the area of interest 350 are analyzed. When performing the border analysis, a most recent image of the border 352 may be compared to at least one reference image. The reference image may be a single image taken at one point in time, or the reference image may be updated periodically. In one illustrative embodiment, the reference image is updated after a set period of time. Alternatively, or in addition, the reference image may be updated upon the occurrence of an event, such as an external signal requesting that a new updated image be taken, or a response to a change in condition of the border 352 of the area of interest 350. In some embodiments, there may be more than one reference image, where a first reference image may be a set image or a recent image and a second reference image may be the second-to-last image taken, such that a first comparison with one image may note immediate changes in the border 352 of the area of interest 250, while a second comparison may note accumulated changes. In any case, by only monitoring the border area 352, the present invention may quickly detect when the border 352 has been breached by object 370. After the border 352 is breached, the present invention preferably sounds an alarm, deactivates hazardous equipment 356 in the area of interest 350, and/or performs some other precautionary measure, but this is not required.

Figure 11A:
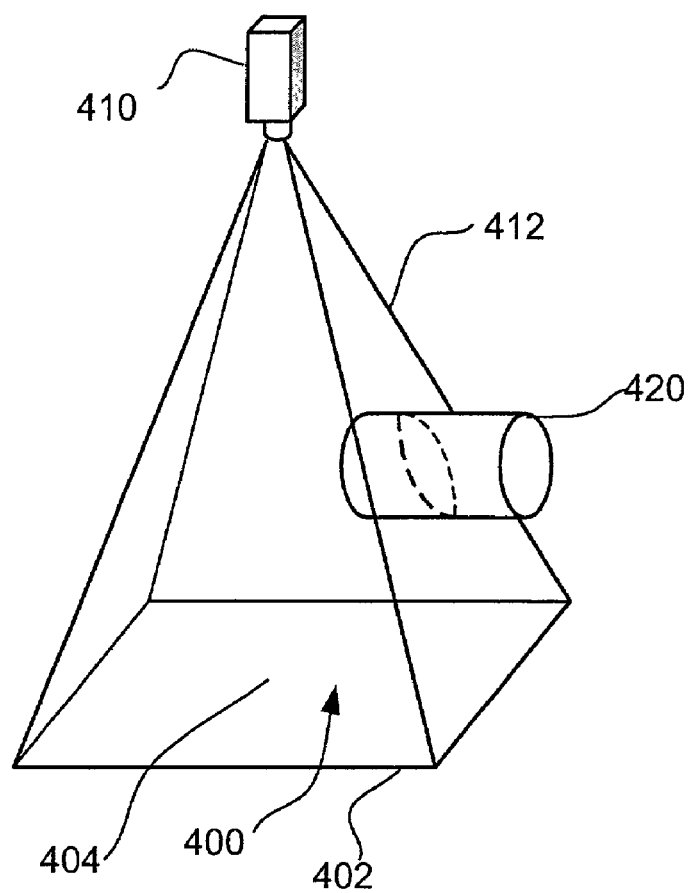
FIG. 11A is a perspective view of an area of interest with an object already across the border of the area of interest.
Figure 11B:
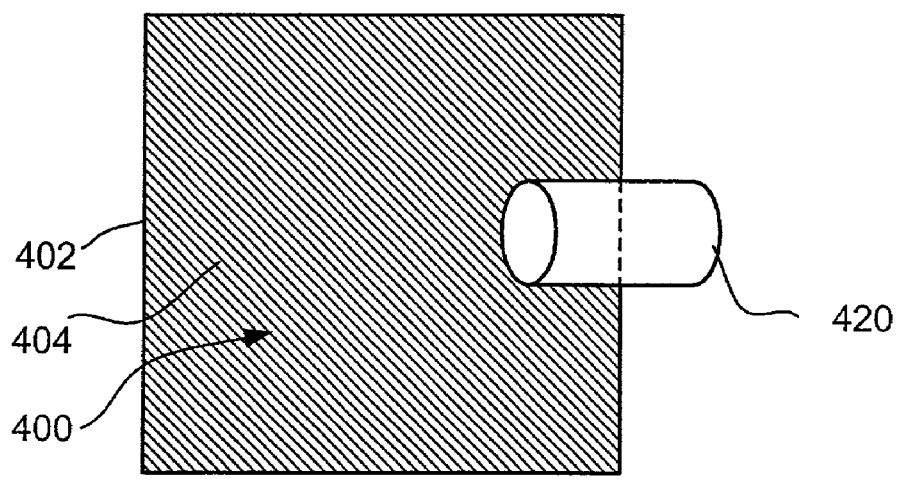
FIG. 11B is an overhead view of the area of interest and the object of FIG. 11A.

FIG. 11A is a perspective view of an area of interest 400 with an object 420 already across the border 402 of the area of interest 400. FIG. 11B is an overhead view of the area of interest 400 and the object 420 of FIG. 11A. Once the border 352 is breached by object 420, the present invention preferably begins analyzing the entire area 404 or selected regions inside the border 402 of the area of interest 400. This may provide some level of presence monitoring of the area of interest 400. In some embodiments, the presence monitoring can be performed at a slower rate than the border analysis, particularly when one or more precautionary measures have already been initiated by a border breach. It is contemplated that both modes of analysis can take place simultaneously or sequentially, depending on the application. In some embodiments, the interior region is defined to include the border region as well.

In some embodiments, the safety monitoring system may return to the original steady state after a second triggering event, and monitors only the border region of the incoming images. The second triggering event may be, for example, a manual reset input signal, the passage of time after which the object 420 does not move with respect to the interior 404 or the border 402 of the area of interest 400, the exit of the object 420 from the area of interest 400, a determination that the object 420 is smaller than some pre-selected minimum size, etc.

Figure 12A:
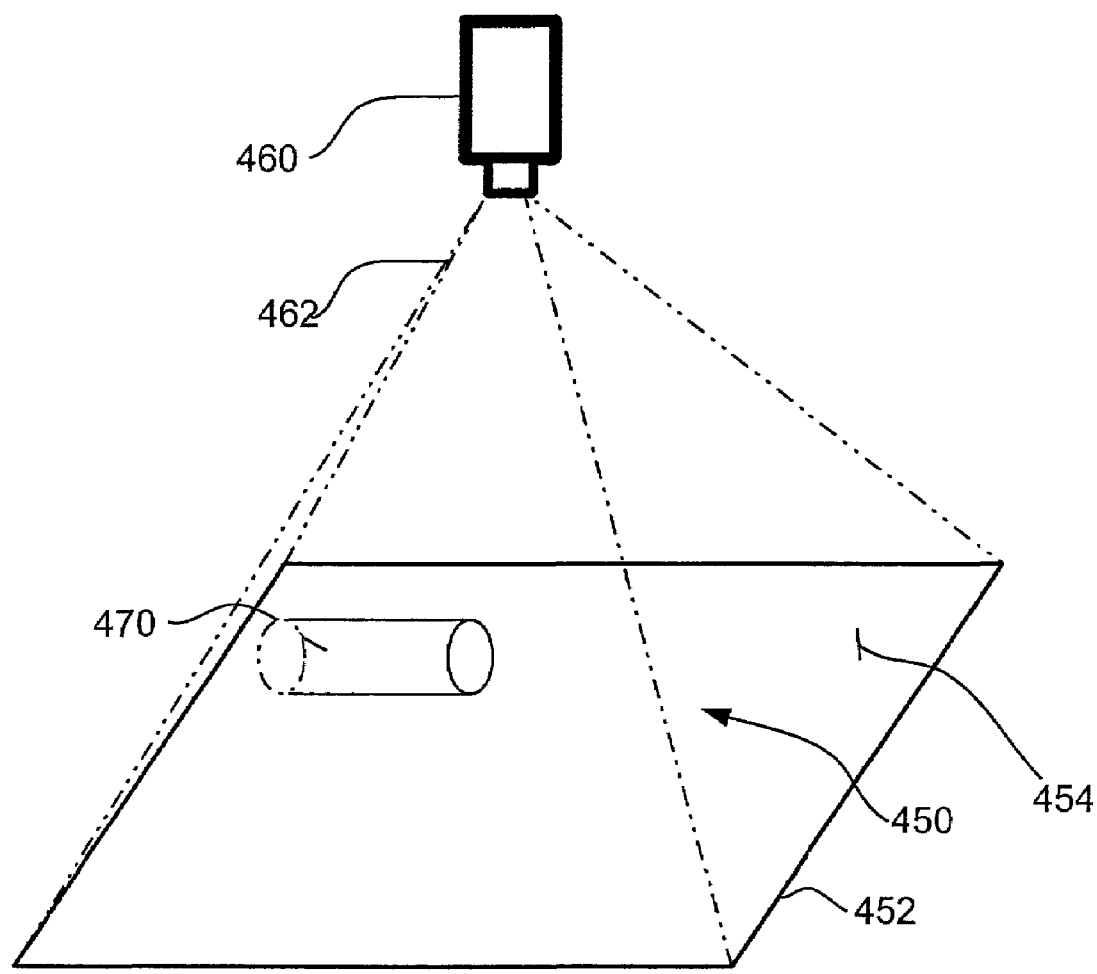
FIGS. 12A is a perspective view of an area of interest with an object entirely within the area of interest.
Figure 12B:
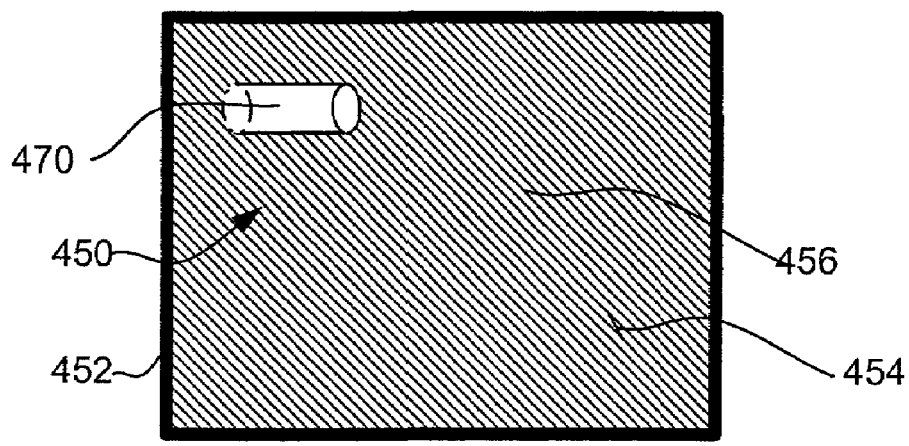
FIG. 12B is an overhead view of the area of interest and the object of FIG. 12A.

FIG. 12A is a perspective view of an area of interest 450 with an object 470 entirely within the area of interest 450. FIG. 12B is an overhead view of the illustrative drawing of FIG. 12A. In some embodiments of the present invention, the object 470 would not be noted within the analysis of the border 452 of the area of interest 450, but it would appear as a change in the interior 454 of the area of interest 450 during interior monitoring, which may start when the object 470 breaches the border 452. As indicated above, the safety monitoring system may return to the original steady state after a second triggering event. The second triggering event may be, for example, a manual reset input signal, the passage of time after which the object 420 does not move with respect to the interior 404 or the border 402 of the area of interest 400, the exit of the object 420 from the area of interest 400, a determination that the object 420 is smaller than some pre-selected minimum size, etc. When returning to the original steady state with the object still within the area of interest, the safety system may update the reference image to reflect the change in the interior 454 and/or border 42 of the area of interest 450.

Figure 13:
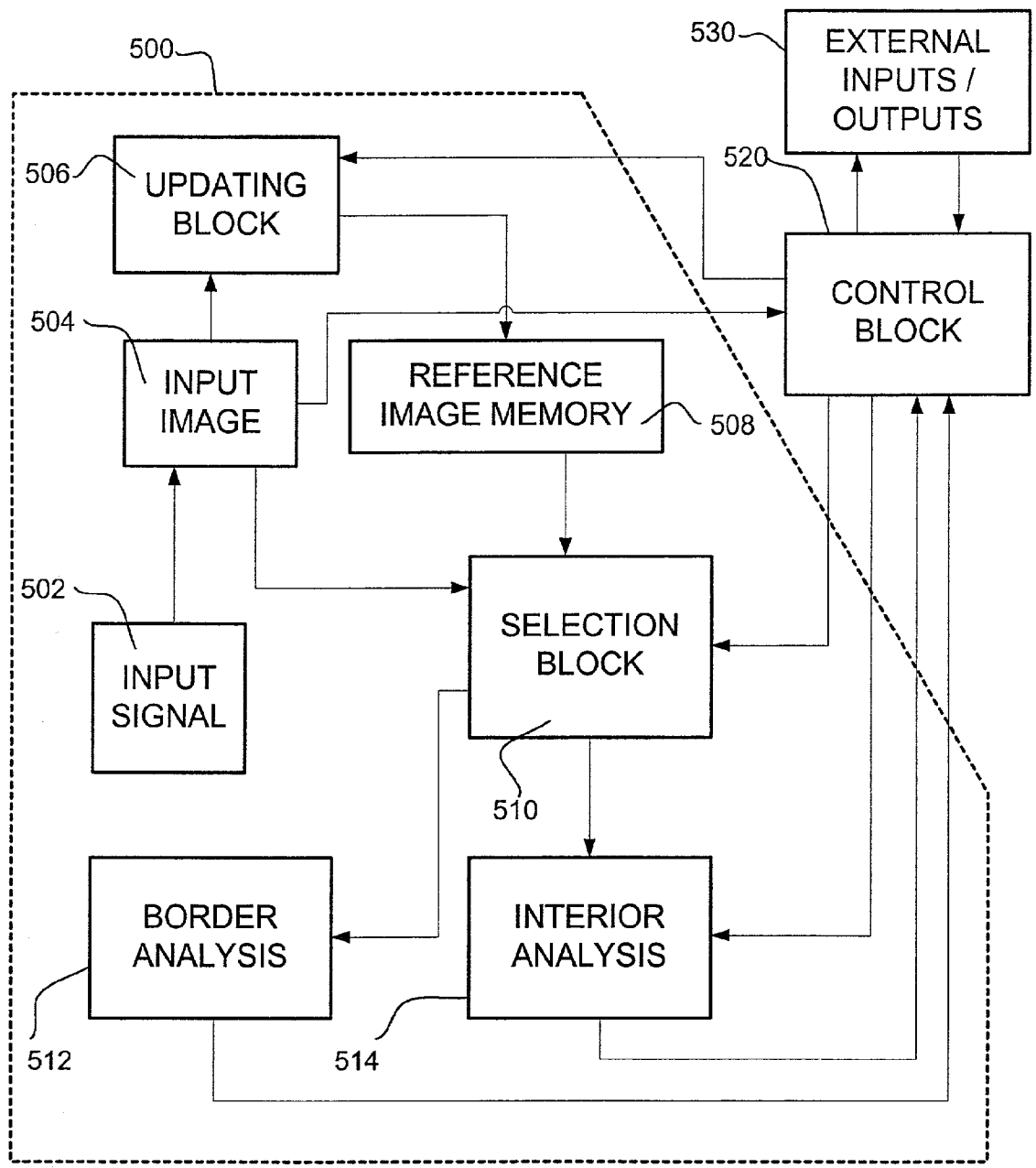
FIG. 13 is a block diagram showing an illustrative safety camera system in accordance with the present invention.

FIG. 13 is a block diagram showing an illustrative safety camera system in accordance with the present invention. An image analysis block 500 receives an input signal 502 from, for example, a digital or analog video camera, CCD or the like. Input signal 502 may include a synchronization signal or other signal for indicating when, during the data stream, data relating to a new frame begins. The input signal 502 is used to provide an input image or frame 504, which may be stored in a memory or file.

Once an input new image is received by input image block 504, a signal may be sent to the control block 520. The control block may control the operation of the image analysis block 500. For example, when a new reference image is desired, the control block 520 may notify the updating block 506, which transfers the current image to the reference image memory block 508.

The selection block 510 may allow a user to define, for example, an area of interest, borders, excluded areas, etc. Whether the selection block 510 and/or control block 520 elicit any area, interior, and border definitional data is dependent upon the particular system needs and capacities. In some embodiments, a mask may be used on the camera(s) to limit the field of view of the cameras to reduce the amount of data that needs to be saved and/or processed.

As the input image 504 is received at the selection block 510, the selection block 510 also accesses the reference image memory 508. Portions of each of these images are then sent to the border analysis block 512, as per instructions from either the control block 520 or stored within the selection block 510. Border analysis block 512 receives image data from the selection block 510 and determines whether an object has intruded into the area of the input image 504 that is defined as the border. The border analysis block 512 sends an output to the control block 520 indicating the results of the border analysis.

In some embodiments, the selection block 510 may send data to the interior analysis block 514 after a triggering event has occurred, such as detection of an object by the border analysis block 512. The control block 520 may direct the selection block 510 to send such data, or the control block 520 may pass on a signal indicating a violation has taken place to the selection block 510, which may contain instructions as to how to respond. The interior analysis block 514 may receive data relating to the interior area of the area of interest and, upon prompting from the selection block 510 or control block 520, may perform analysis on the interior of the area of interest. The interior area of the area of interest may, in some embodiments, include the border region as well. Upon completion of such analysis, the interior analysis

514 may send a signal back to the control block 520 indicating the results of the interior analysis.

There may also be external inputs and outputs 530 connected to the control block 520. Some inputs may include, for example, a manual alarm, a reset switch, a restart switch, communication links for updating definitional data relating to the area of interest, interior, and borders, equipment status monitors, on/off switch, etc. Some outputs may include, for example, a connection to equipment or machines controlling the speed, operation, state, or other characteristics, including whether such equipment or machine is on or off, connection to a brake for stopping equipment or machines, audible or visible alarm systems, communication links to emergency services, monitoring facilities, security, upkeep, custodial or other maintenance facilities or personnel, etc.

In a preferred embodiment, the control block 520 may turn off the interior analysis 514 under some conditions, for example, when it is determined that no border violation has occurred. Further, in some embodiments, the border analysis and interior analysis may be performed by the same processing unit at different times, as shown and described with reference to, for example, in FIG. 19 (processor 2, 890).

It is contemplated that some or all of the capture images and/or reference images may be saved for later viewing, if desired. For example, when a breach is detected, the capture and/or the reference images may be saved to a storage medium such as a hard disk, RAM, Compact Disk, magnetic tape or any other storage medium. At a subsequent time, the images may be viewed to identify the situation that occurred.

To help increase the overall reliability of the system, it is contemplated that two or more image analysis blocks 500 may be provided, each receiving an input signal 502 from, for example, a digital or analog video camera, CCD or the like. In this embodiment, both image analysis blocks 500 may analyze the capture image, and provide signals to control block 520. Control block 520 may then only provide external output signals when both image analysis blocks 500 agree that an external output signal is warranted.

Alternatively, or in addition, two or more imaging devices such as digital or analog video cameras, CCDs or the like may be provided, each providing an image of the area of interest to a corresponding control block 500. In this embodiment, all image analysis blocks 500 may analyze the corresponding images, and provide signals to control block 520. Control block 520 may then only provide external output signals when all image analysis blocks 500 agree that an external output signal is warranted.

Figure 14:
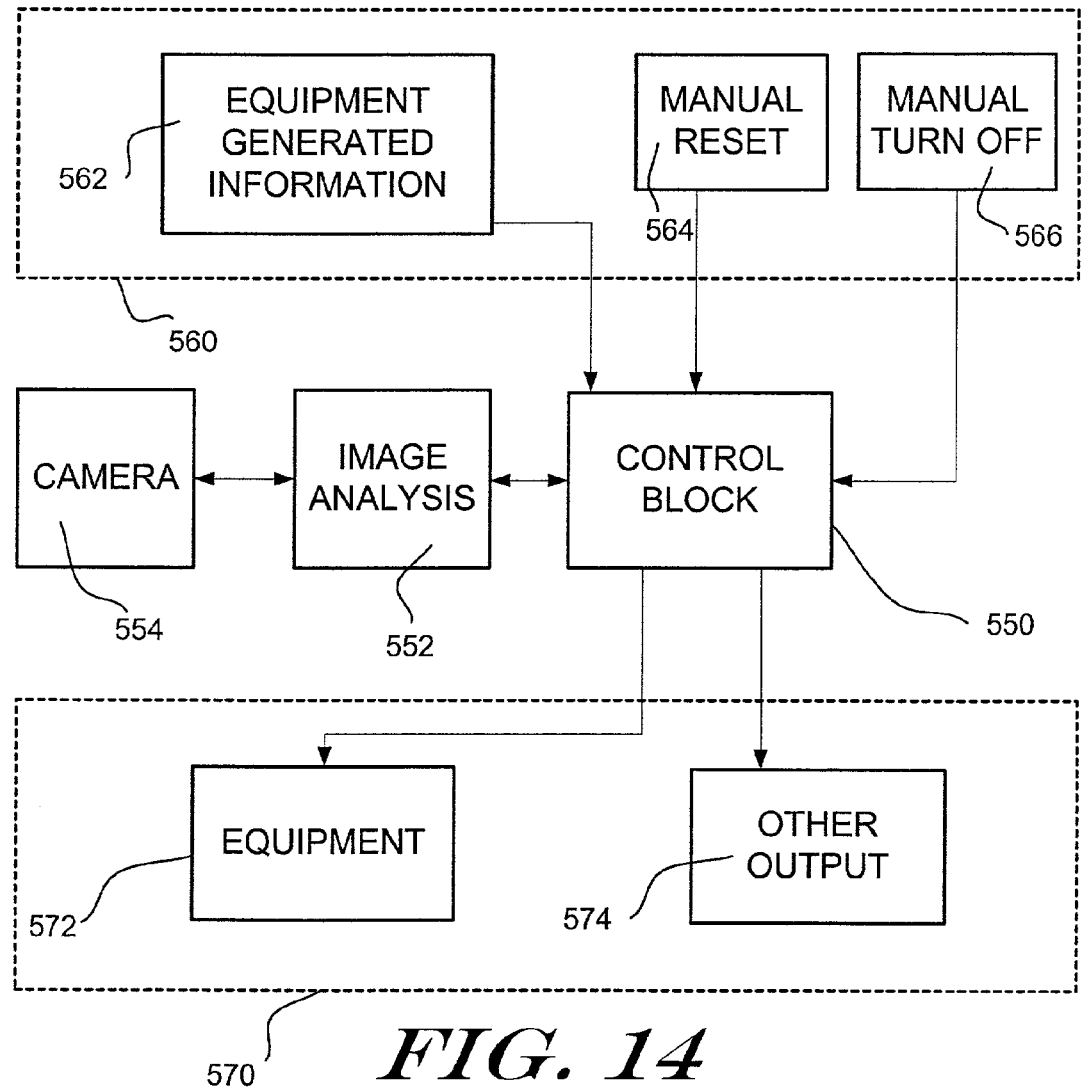
FIG. 14 is another block diagram showing an illustrative safety camera system in accordance with the present invention.

FIG. 14 is another block diagram showing an illustrative safety camera system in accordance with the present invention. In this illustrative embodiment, inputs 560 to a control block 550 may include equipment-generated information 562, such as equipment operation speed, fluid levels, internal temperature, cover or shell integrity signals, error signals, and other information relating to the status, upkeep, or operation of equipment. If the equipment were, for example, an internal combustion engine, equipment generated information could include indications of oil pressure, fuel level, heat level, etc. Other inputs 560 may include manual reset 564 and manual turn-off 566, for example.

Also in the illustrative embodiment shown, outputs 570 from the control block 550 may include an output to the equipment 572, and other outputs 574. The output to the equipment 572 may include signals such as off, idle, startup, stop, or could apply a brake, regulate speed of operation, close emergency safety guards, etc. Other outputs 574 could include sirens, bells, whistles, lights and emergency signals to warn emergency crews, or may be include a memory device that could keep track of the timing and number of unsafe condition messages generated by the safety monitoring system.

Figure 15:
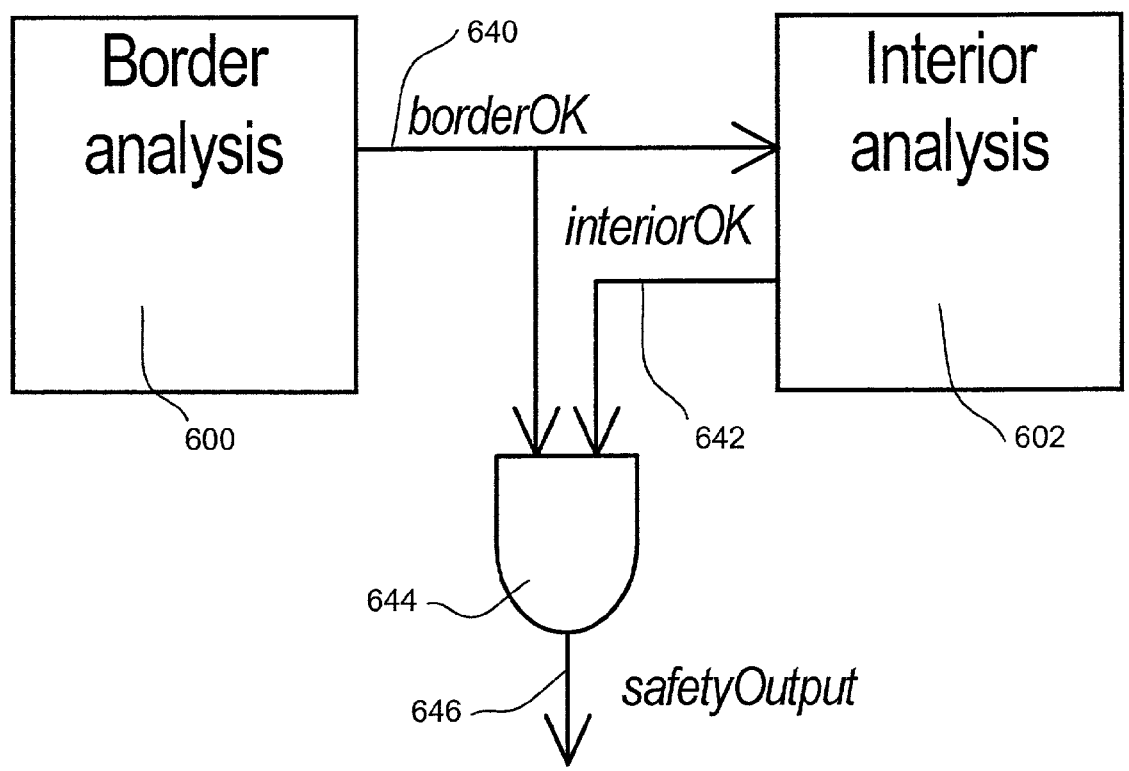
FIG. 15 is a flow chart showing an illustrative relationship between border and interior analysis functions in accordance with the present invention.

FIG. 15 is a flow chart showing an illustrative relationship between border and interior analysis functions in accordance with the present invention. In the illustrative embodiment, the safety output 646 is used to disable the equipment, set off an alarm, etc. The safety output is generated by a Boolean AND function 644, which ANDs the border analysis output 640 with the interior analysis output 642. That is, the border analysis output 640 must indicate that no object has breached the border, AND the interior analysis output 642 must indicate that no object is currently in the interior of the area of interest before the safety output 646 is set high. In one embodiment, the equipment in the safety zone can only be operated when the safety output 646 is high.

In some embodiments, the border analysis 600 may include a quick examination of a minimum number of pixels to establish whether there has been an access violation. In many cases, the border region will include a fewer number of pixels than the interior region. The border analysis algorithms are preferably optimized to analyze the limited number of pixels with the fastest possible response time.

One way to achieve fast, reliable, and robust object detection along a border region is to provide a reference marking on the floor along the desired border, such as with tape or paint. An example of such an approach is shown in FIG. 4B above. A preferred method for performing object detection using a reference marking is disclosed in co-pending U.S. patent application Ser. No. H16-26483, which has been incorporated herein by reference. However, such a reference marking is not required for the present invention. In one illustrative embodiment, border analysis 600 compares the border pixels in the live image with those in the reference image. If a region is detected where the computed difference is greater than a specified threshold, a more detailed analysis can be performed on the region to determine whether the difference is due to an intruding object, a shadow or some other cause. If the difference is determined to be a shadow, the border analysis preferably resumes, examining other regions for detected differences.

In some embodiments, the border analysis may terminate when one of the following conditions is reached: an object is detected on the border; all of the differences have been determined to be shadows or other non-objects; or the time available to perform the border analyze has expired. The resolution used for object detection preferably is set to detect hands, feet, or other objects of similar (or smaller) size that are likely to first penetrate the border. Once the object size is set, the object detection may be limited to detect only objects of the specified size or objects with bigger size. In some embodiments, the minimum size of objects to be detected is automatically determined from a reference object, reference markings or some other feature in the reference image during a configuration procedure. Additionally, the minimum size of the objects to be detected can be different for the border analysis than for the interior analysis. For example, the minimum size of objects used for the border analysis (e.g. hand) may be smaller than the minimum size used for the interior analysis (arm, body, etc.).

Border analysis 600 may be performed for every image captured to achieve the minimum response time. That is, the border analysis 600 may be triggered by arrival of a new image frame from an image input device such as a camera. Other embodiments may perform border analysis 600 on less than all received images, using some of the received frames to perform image verification processes to, for example, help assure that the image capture devices (e.g. cameras) are functioning properly. For example, and as shown and described below with reference to FIG. 22, one half of the frames may be used for border analysis, while the other half may be used for camera verification procedures.

The interior analysis block 620 may determine whether there is any new, unexpected, or undesired object present inside the area of interest. The interior analysis 602 may, in some embodiments, be limited to finding objects greater than a specified minimum size. Smaller objects and debris on the floor can, in some embodiments or applications, be ignored. The interior analysis 620 may not need to be performed for every image frame received, but instead may be invoked on demand when needed, for example, after a triggering event such as the breach detected by the border analysis block 600.

Analysis of the interior of an area of interest typically must process more pixels and may require more computation time than the border analysis 600. To help increase the speed and robustness of the interior analysis 602, a reference marking may be provided on the floor of the interior of the area of interest. However, in some applications it may not be desirable or possible to do so. A longer response time may be acceptable for interior analysis 602 since it is not used for the initial detection of a safety violation, but instead can be used for interior analysis that takes place after a border violation is detected. The slower algorithms and analysis may thus be acceptable because the system is already "aware" of the safety violation, and ameliorative actions may have taken place, for example, shutting down a hazardous machine or setting off alarm systems.

The border analysis 600 and interior analysis 620 procedures can be used together to maintain safety for the overall system. The interaction of these two analyses can be thought of as a gate that "closes" the safety zone. When the border analysis 600 determines that no object is in the process of entering the safety zone, the border of the safety zone is "closed". The interior analysis can then work to determine whether there is an object present in the interior of the safety zone. Once the interior is found to be empty and no further border violation occurs, the system is in the safe or original steady state mode. As long as the border remains "closed" (no access violation), the system preferably remains in the safe or original steady state mode.

Sometimes, during the time that the interior analysis 620 is being performed, a border violation occurs. In this case, the interior analysis 620 may be repeated with a new image frame obtained after the border is clear again, since a border violation during a first interior analysis may suggest an additional object has entered the safety zone which is not included in the frame used during the first interior analysis.

Figure 16:
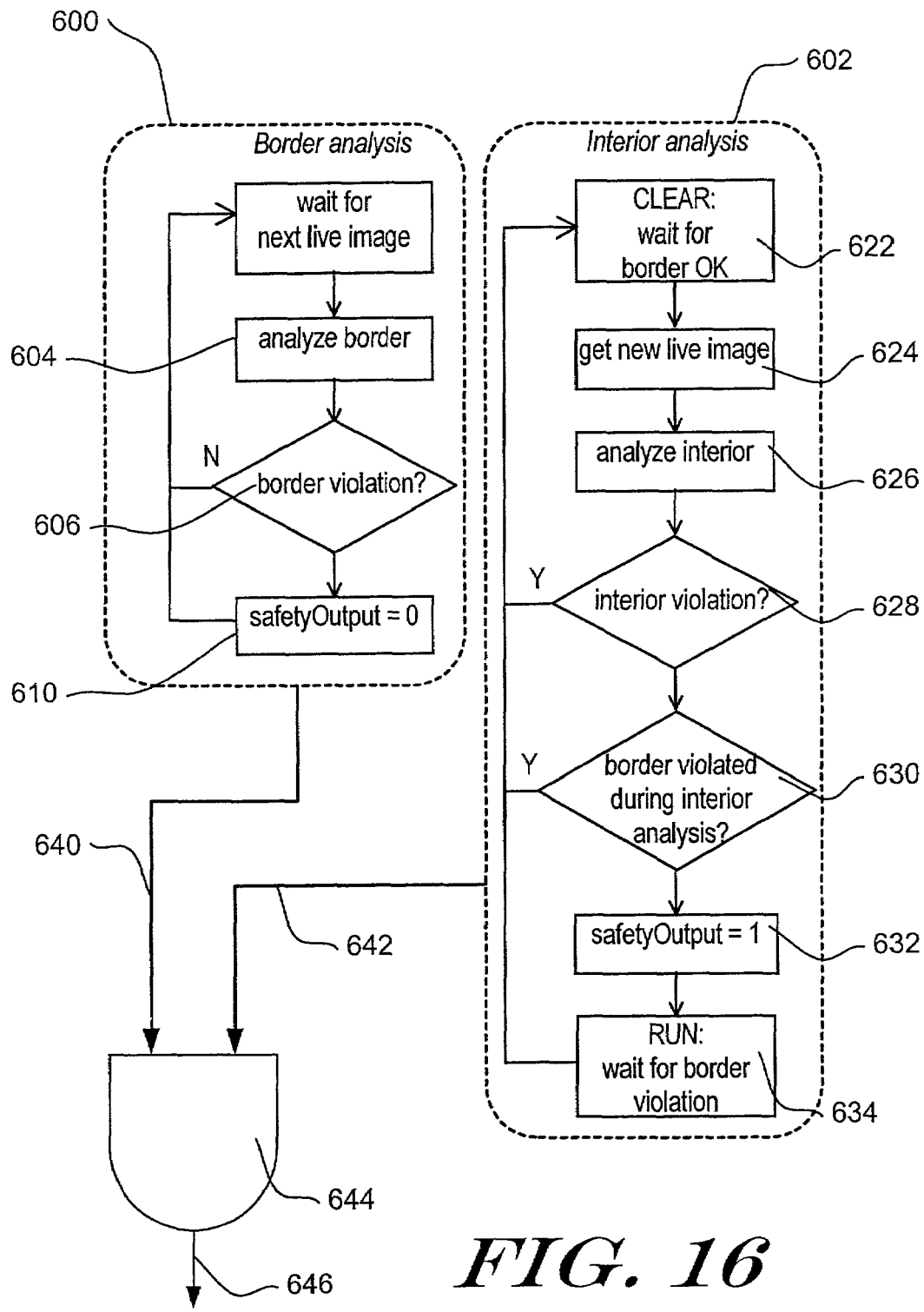
FIG. 16 is a flow chart showing an illustrative method for performing interior and border analysis in accordance with the present invention.

FIG. 16 is a flow chart showing an illustrative method for performing interior and border analysis in accordance with the present invention. The border analysis block 600 and interior analysis block 602 of FIG. 15 are shown in FIG. 16, outlined in dashed lines. After the illustrative system is powered up or reset, the system preferably determines whether the safety zone (e.g. area of interest) is empty before activating the safety output 646. To do so, the illustrative control system preferably waits for an indication that the border is not being violated, as shown at block 622. Border analysis block 600 determines if there is a border violation by obtaining a next live image, analyzing the border of the live image as shown at 604, and determining if there is a border violation as shown at 606. If there is a border violation, the safety output of the border analysis block 600 is set to zero, as shown at 610. If no border violation is detected at 606, a next live image is received and the process is repeated.

Once no border violation is detected, the interior analysis block 602 receives a new live image, as shown at 624 of the area of interest. The interior analysis block 602 then analyzes the interior of the safety zone, as shown at 626. After completing the interior analysis 626, the system may determine whether there has been a violation of the interior, as shown at 628. If there has been a violation of the interior, the system may return to block 622 and wait for an indication that the border is no longer being violated. If there is no interior violation, the system may check whether the border has been violated during the interior analysis, as shown at 630. In some embodiments, the received frames may be saved into memory during the interior analysis. After the interior analysis is complete, border analysis 600 may be performed on the saved frames in a relatively short amount of time, and the system may conclude that no border violations have occurred during the interior analysis. If the border has been violated, the system may return to block 622 and wait for an indication that the border is no longer being violated.

If no border violation occurred during the interior analysis at block 630, and the interior analysis 628 determines no interior violation has occurred, the system may generate an output indicating the system is safe, as shown at 632. Once safe, the system may enter the RUN state as shown at 634.

When both border analysis 600 and interior analysis 602 indicate safe conditions, the safety output signal 646 may go high, indicating safe operating conditions. The RUN state 634 is a safe or steady state in which the illustrative system performs no further interior analysis until a border violation is detected. When a border violation is detected, the system returns to block 622 and waits for an indication that the border is no longer being violated.

Figure 17:
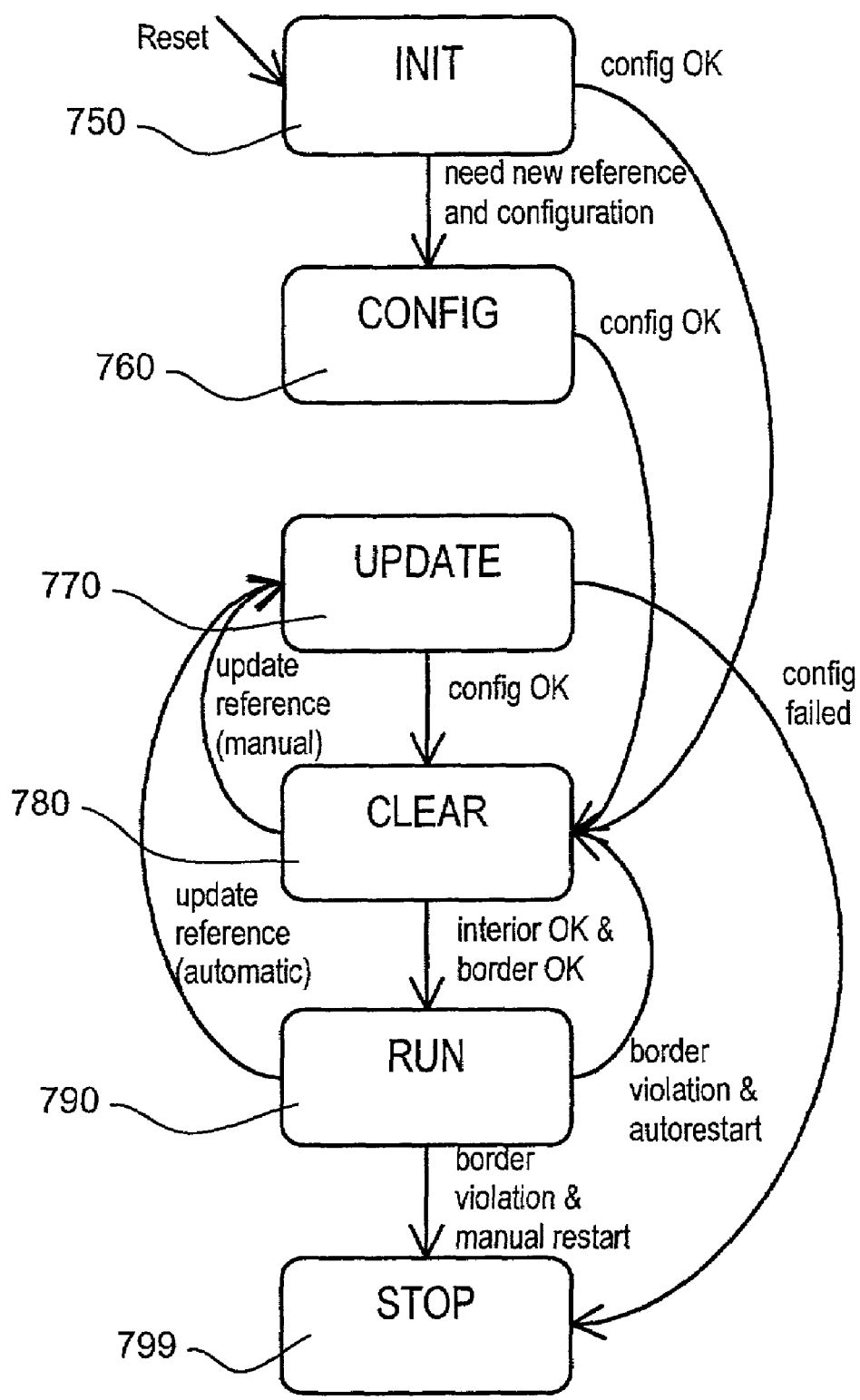
FIG. 17 is a state machine diagram of an illustrative embodiment of the present invention.

FIG. 17 is a state machine diagram of an illustrative embodiment of the present invention. In the initialization state 750, the system may determine whether a current configuration is valid or a new reference image and safety zone configuration is necessary or desirable. In the configuration state 760, the system may communicate with an operator to capture a new reference image, define a desired safety zone, and/or compute the needed configuration data for use in the safety monitoring procedures. It is contemplated that the system may automatically identify the border region and/or interior region in the reference image from a reference marker positioned in the area of interest. The reference marker may be, for example, a pattern on the floor, etc. Once the configuration is complete (and accepted by the operator) the system may switch to the clearing state 780 in which the interior analysis is performed. The border analysis may also start at this time and run continually whenever a new frame is received, or, in an alternative illustrative embodiment, when every other new frame is received. When the safety zone border and interior are determined to be free of safety violations, the system switches to the running state 790. The safety output may also be activated at this time, while the border analysis continues. When a border access violation is detected, the system preferably deactivates the safety output and switches to either the stop state 799 (for a manual restart) or the clear state 780 (if an automatic restart is desired).

In some applications, the lighting conditions may vary significantly throughout the day. Under these conditions, it may be desirable to include a procedure for automatically updating the reference image and the configuration data to account for changing lighting conditions. While there is no safety violation (in the run state 790), the system may periodically switch to the update state 770 to capture a new reference image and compute new configuration data corresponding to the new reference image. If a valid configuration is achieved and there is no safety violation with the new configuration the system may return to the run state 790. Alternatively, if there has been a safety violation and the system is unable to confirm that the interior of the safety zone is empty (due to, for example, some extreme change in lighting conditions) an operator may choose to manually initiate the update procedure. The system may include an output directed to a light source that may be varied as ambient light conditions change in order to maintain consistent lighting in the area of interest. The system may then capture a new reference image for the current lighting conditions and attempt to return to the run state 790 if a valid configuration is obtained and the safety zone is determined to be empty.

Figure 18:
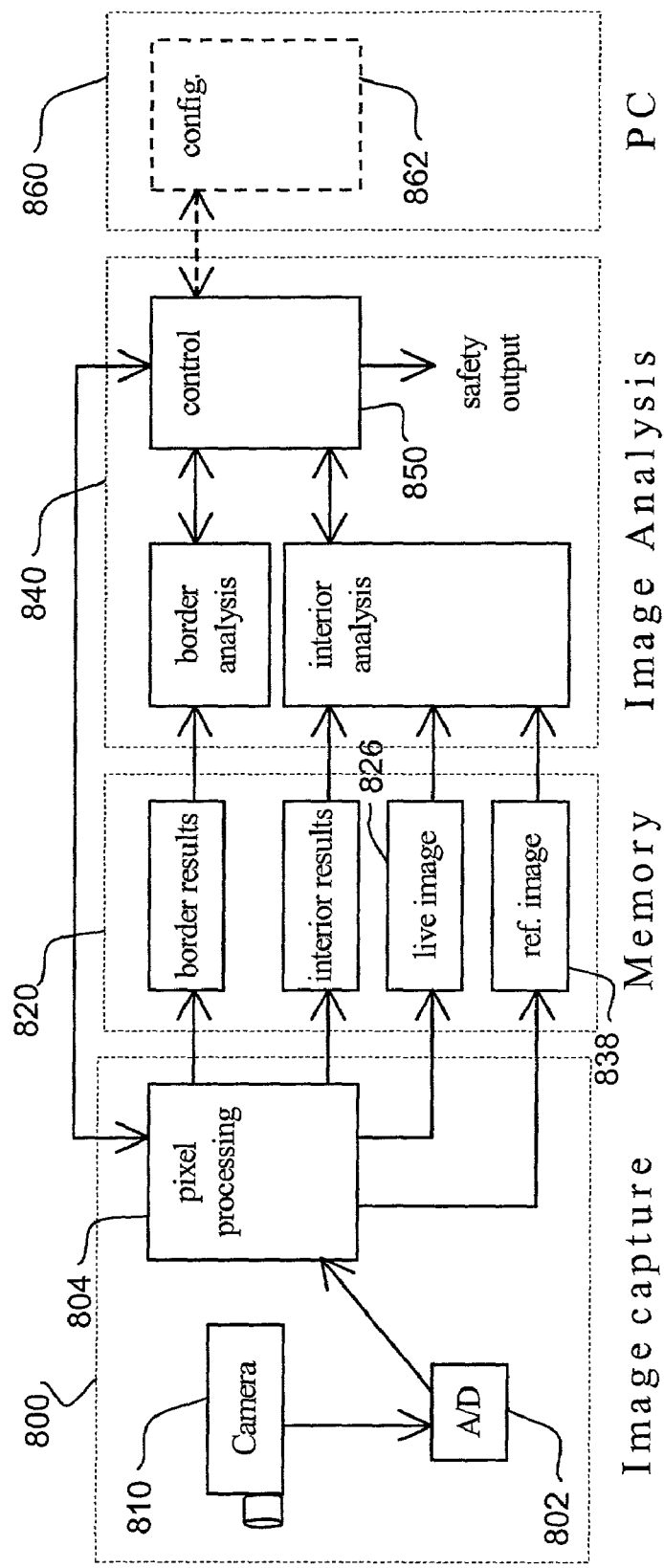
FIG. 18 is a block diagram showing an illustrative data flow and analysis in accordance of the present invention.

FIG. 18 is a block diagram showing an illustrative data flow and analysis in accordance of the present invention. In the illustrative embodiment, an image capturing device is shown, and is preferably a standard black and white CCD video camera 810 operating at thirty frames per second. Use of a color or CMOS-based camera is also contemplated. Other frame rates are also possible, and they will impact the response time of the system. In the illustrative embodiment, an analog output signal from the camera 810 is converted to an eight-bit digital sequence of luminance data (pixels) by an analog/digital converter 802. A pixel processing block 804 performs initial analysis on the digitized output of the camera 810.

Figure 24:
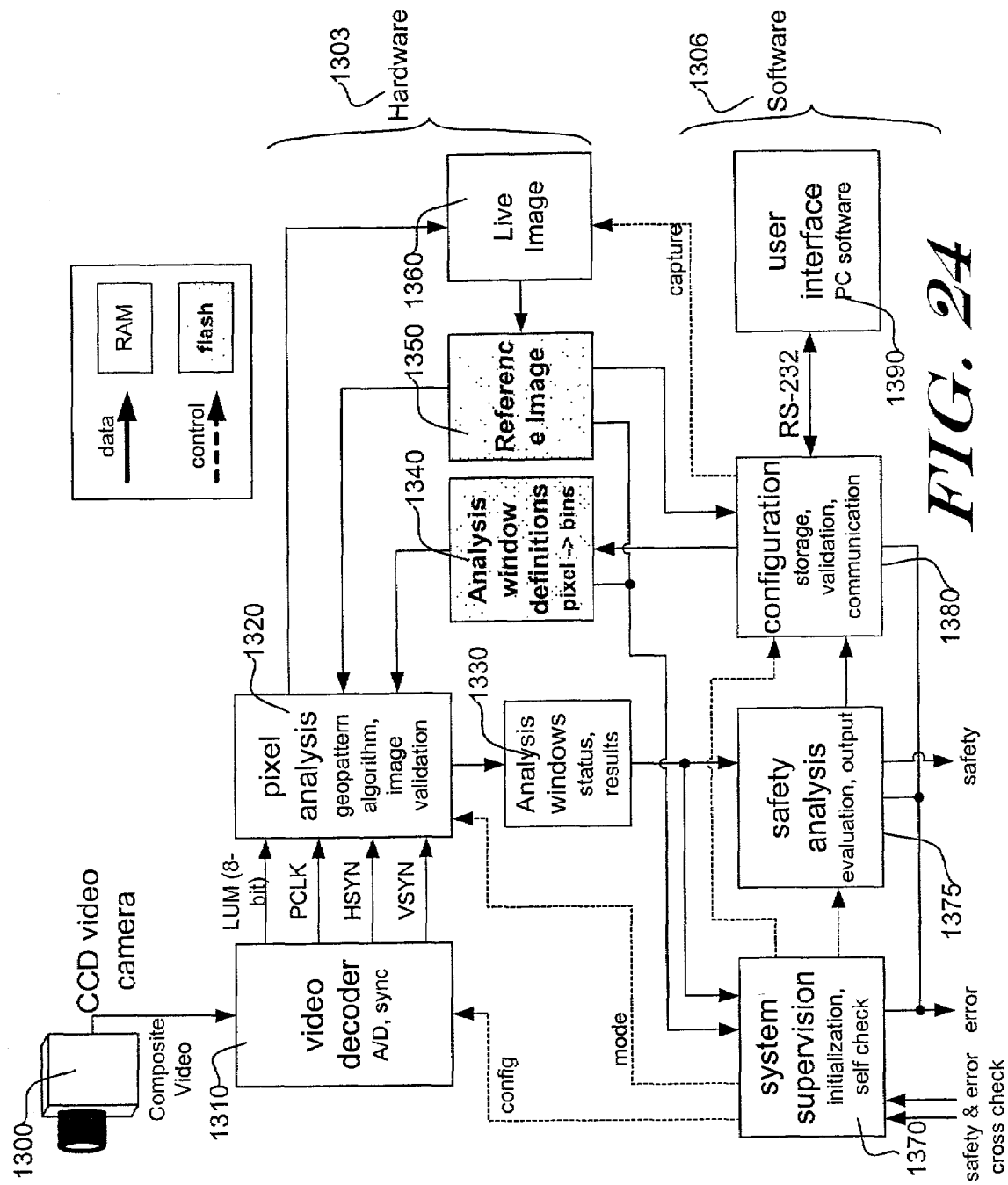
FIG. 24 is a functional block diagram of another illustrative embodiment of the present invention.

For faster response times, the pixel processing device may use, for example, two pipelined processing elements, as shown in FIG. 24. A first stage processor may be selected to assure sufficient speed to perform initial processing of the pixel data received from the camera 810. Pixel data may be received at, for example, a rate of about 12.5 MHz for a standard video input signal. The first stage processor may, for example, perform initial sorting and accumulation steps of the object detection algorithm for the pixels on the border of the safety zone in each image produced by the camera 810. These interim results are preferably stored in a memory, as shown at 820. When commanded by the control block 850, the first stage processor may also perform an initial differencing and thresholding operation as the first step of the interior analysis procedure.

A second stage processor may be, for example, a standard microcontroller that receives the initial analysis results stored in memory 820 and performs the remaining border and interior analysis processing to determine the correct state of the safety output, as shown at 840. The second stage processor may also implement the control function, as shown at 850. The second stage processor may be signaled via an interrupt when the first stage processor completes its portion of the analysis. The second stage processor may then perform averaging and comparison operations of the object detection algorithm, and deactivate the safety output if a border access violation has been detected.

If a border access violation has been detected, the second stage processor may send one or more signals to the first stage processor to capture a live image and perform the initial interior analysis operations. When this is complete, the second stage processor may use the results stored in memory 820 to complete the interior analysis. The controller 850 may direct the pixel processing block 804 to capture a new reference image, as desired.

To define a desired safety zone, a software program 862 or the like may be executed on a separate computer 860, such as a PC. The software preferably enables an operator to capture and view a reference image and graphically identify the border of the desired safety zone as it appears in the image. The configuration data needed by the border and interior analysis procedures may be sent back to the pixel processing block 804. The computer 860 used for the configuration procedure may not be needed during normal operation of the safety system.

Figure 19:
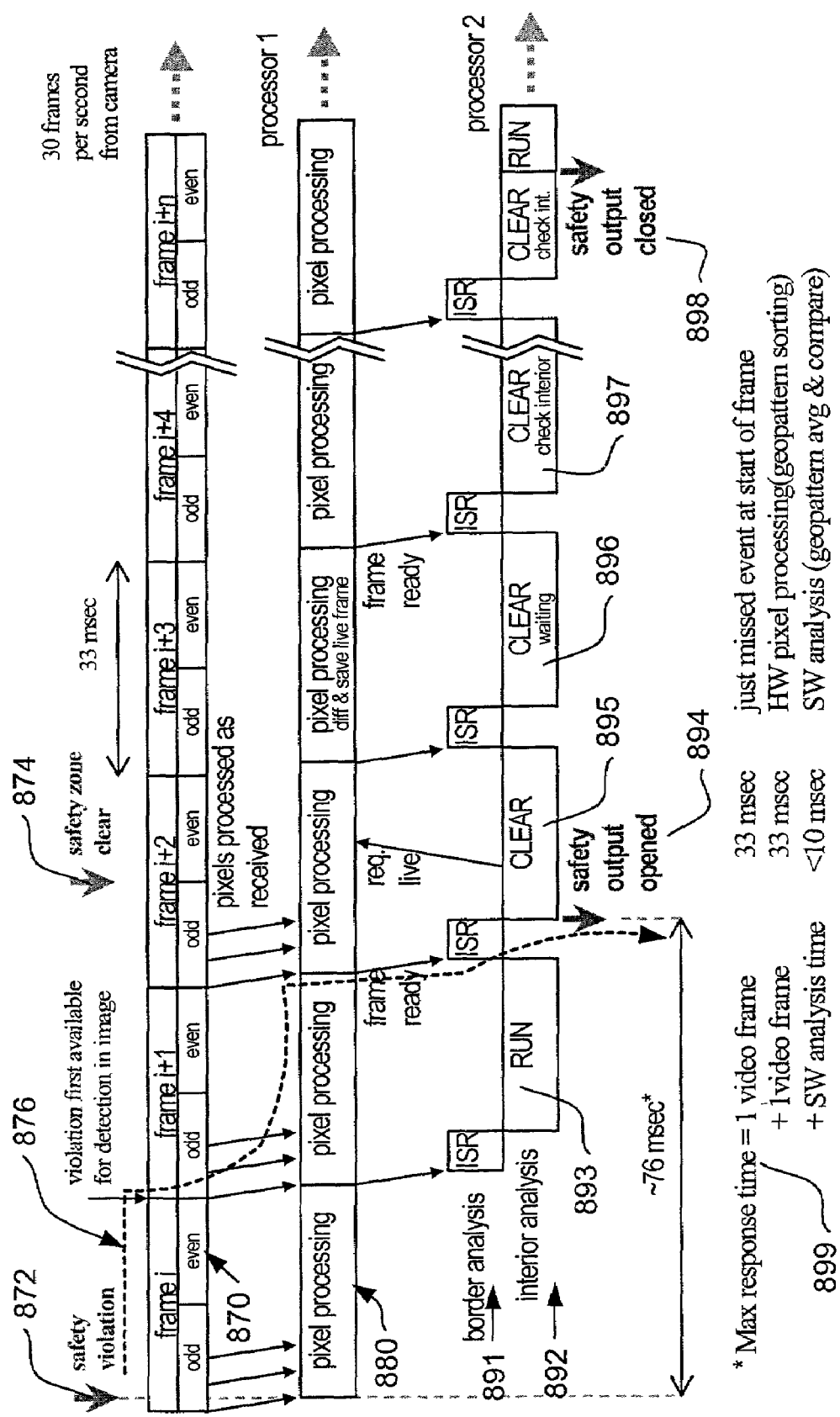
FIG. 19 is a timing diagram showing illustrative timing relationships for the embodiment of FIG. 18.

FIG. 19 is a timing diagram showing illustrative timing relationships for the embodiment of FIG. 18. A top line 870 corresponds to a camera output, numbering individual frames i, i+1, i+2, etc. In the illustrative example, individual frames arrive every thirty-three milliseconds, as the camera takes thirty frames per second. A second line 880 may correspond to a first processor, which performs pixel processing on each successive frame received. Preferably, the pixels are processed as they are received, so that at a time just after data for a given frame is completed, the first processor can send the ready frame to the second processor, which corresponds to line 891.

Typical data flow for the illustrative embodiment of FIG. 19 is shown by dashed line 876. An image is captured and sent via a data stream to pixel processing, which preferably does not process the entire image simultaneously, but rather performs pixel-by-pixel processing. The output of pixel processing is preferably stored in a memory, which is then read by the second processor. The second processor preferably performs a border analysis once all of the pixels of an image are processed by the first processor.

In other embodiments, the entire processing may be performed pixel by pixel, for example, by comparing each individual pixel received to a corresponding reference pixel. Alternatively, or in addition, the pixel information may be filtered in a first state so that, rather than processing the pixels for an entire frame before performing border analysis, only pixels corresponding to the border region are processed, while the other pixels are ignored, discarded, or further filtered to save those pixels that correspond to the interior of an area of interest.

The second processor, as shown by line 891, may use the thirty-three milliseconds between arrivals of new frames to perform two different functions. As shown, border analysis may take up a relatively short period of time for the second processor. Once the border analysis is complete, the second processor 890 may begin processing the interior, if appropriate. The interior analysis, as shown at 892, preferably begins in the RUN state 893, but preferably only after the safety output is opened 894 as a result of a border violation. The second processor then enters the CLEAR state 895.

The CLEAR state 895 requests a new live image from the first processor, and then enters CLEAR WAITING state 896 until the new live frame is ready. Then, the second processor goes from CLEAR WAITING 896 into CLEAR CHECK INTERIOR 897, and performs an interior analysis. In the illustrative embodiment, this is repeated until the frame 874 that shows that the safety zone is clear is processed by the second processor, wherein the safety output is closed as shown at 898.

As shown at the bottom 899 of FIG. 19, the maximum response time is equal to the time it takes for a new frame to be captured by the camera, plus the time it takes for pixel processing of the new frame to be completed, plus the time it takes for the border analysis to be completed. In the illustrative embodiment, the maximum response time is about seventy-six milliseconds, less than one-tenth of a second.

Response times can vary depending on a wide number of factors. A faster camera can take more frames per second, reducing the maximum delay times significantly. A higher resolution camera may be useful to detect smaller objects, but may increase the processing times. One way to counteract the effect of a faster camera on processor time may be to define the border to include a smaller area, which in turn may decrease the likelihood that a small or fast moving object can completely cross the border without being detected. Alternatively, faster processors may be utilized, but this may increase the cost of the system. Also, the border region may be defined using different patterns that may maximize the effectiveness of the pixel processing. More sharply defined borders, however, may in turn reduce the robustness of the system. Such variables should be considered and weighed in determining the best system for a given application and/or environment.

Figure 20:
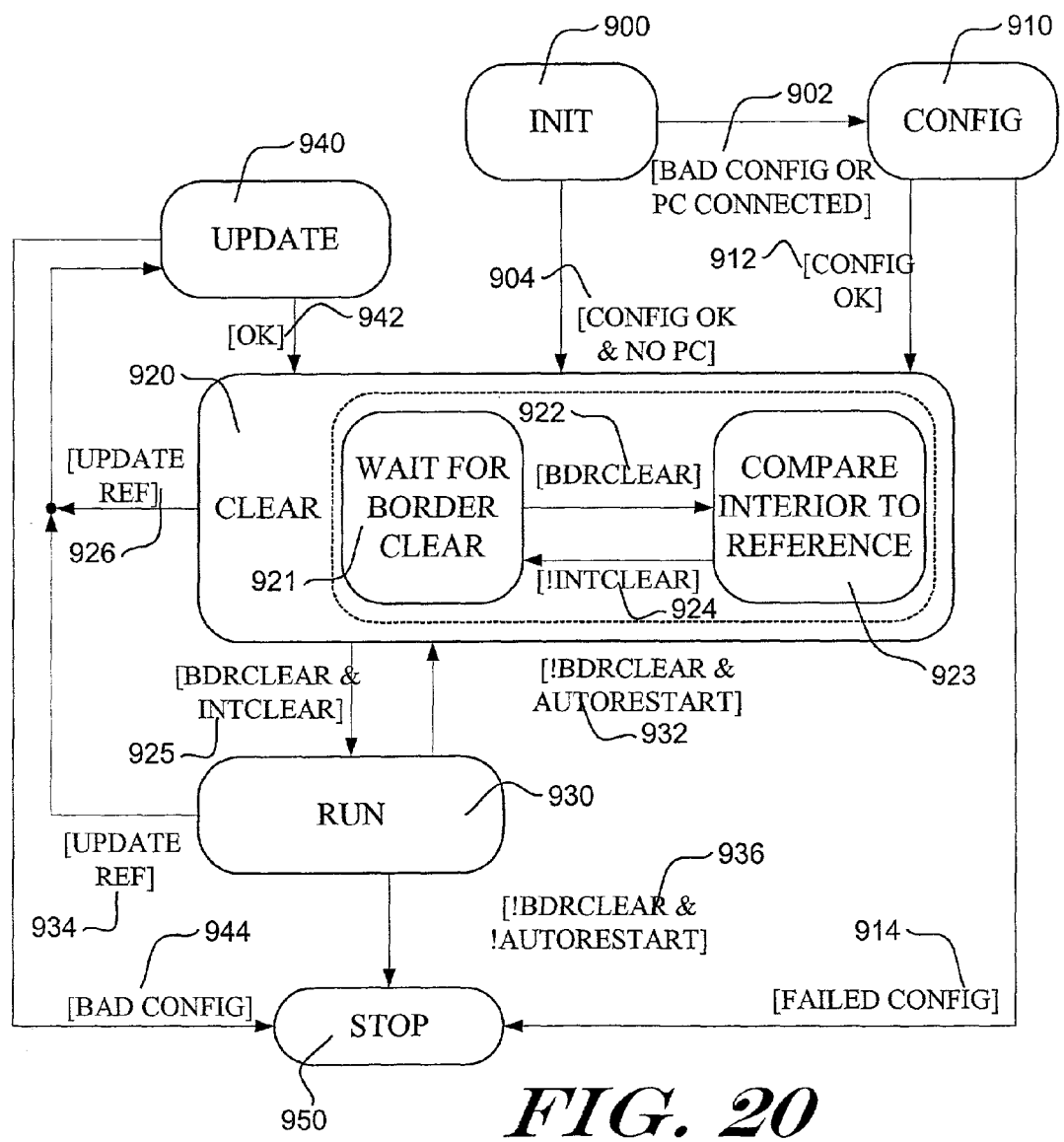
FIG. 20 is a state diagram showing the progression of states for an illustrative embodiment of the present invention.

FIG. 20 is a state diagram showing the progression of states for an illustrative embodiment of the present invention. An INIT block 900 may perform such functions as initializing hardware, performing a self-check or a camera check, and starts all internal processes. If there is a bad configuration or pc connected, as shown at 902, the illustrative embodiment moves to a CONFIG block 910. Otherwise, if the configuration is ok and no PC is connected, as shown at 904, the illustrative embodiment moves to the CLEAR block 920.

In the CONFIG block 910, configuration routines may be initiated, including, for example, capturing of a new reference image. If a pc is connected, a new reference image may be routed to the pc, and definitions for a safety zone and windows for analysis may be returned by the pc, as described above. If there is a pc, the user of the pc may confirm the validity, as part of the routines in the CONFIG block 910, via a user interface. For each defined analysis window, the CONFIG block 910 may determine median, light, and dark pixel sets. Also, reference contrast values may be computed and validated, and, if connected, sent to the pc. Border analysis may also begin while in the CONFIG block 910.

If the routines performed within the CONFIG block 910 are successfully completed, the CONFIG block 910 may return with OK 912 and enter the CLEAR block 920. Otherwise, if some of the routines cannot be completed, the CONFIG block 910 may instead return with FAILED CONFIG 914 and enter the STOP block 950.

Once CONFIG OK & NO PC 904 is returned by the INIT block 900 or CONFIG OK 912 is returned by the CONFIG block 910, the illustrative embodiment enters CLEAR block 920. One purpose of the CLEAR block 920 is to determine whether the interior region of the area of interest is clear for a sufficient period of time during which the border region is also clear. In the illustrative embodiment of FIG. 20, a border analysis may be performed more quickly than the interior analysis, as, for example, shown in FIG. 19. Thus, the CLEAR block 920 may include a first subblock, WAIT FOR BORDER CLEAR 921, which in the illustrative embodiment, can be satisfied first, which sends a BDRCLEAR 922 signal to COMPARE INTERIOR TO REFERENCE 923. Once the border is clear, the COMPARE INTERIOR TO REFERENCE 923 is initiated. Analysis performed by WAIT FOR BORDER CLEAR 921 may include comparison of areas of a live image or most recent image to areas of a reference image. The areas being compared may correspond to some of the windows defined in the CONFIG block 910, as further described in co-pending U.S. patent application Ser. No. H16-26483, entitled "OBJECT DETECTION", which is incorporated herein by reference.

The COMPARE INTERIOR TO REFERENCE 923 preferably determines whether it may be safe to initiate operation or a run state (RUN block 930) for the system. Such analysis may include comparison of a live image of the interior of the area of interest to a reference image, and this analysis may be divided into sub-blocks corresponding to some of the windows defined in the CONFIG block 910. If the interior is not clear, indicated by !INTCLEAR 924, the CLEAR block 920 returns to the WAIT FOR BORDER CLEAR 921.

In the illustrative example, a safety output may be defined to be closed when it is safe for operations to resume in the area of interest, and open when unsafe conditions are present. For this particular illustrative embodiment, the safety output is defined as open while in the INIT 900, CONFIG 910, CLEAR 920, UPDATE 940, and STOP 950 blocks. If the CLEAR block 920 determines that the border is clear and the interior is clear, it may go to the RUN block 930, as shown by BDRCLEAR & INTCLEAR 925. Upon the determination that the border and interior are both clear, the CLEAR block 920 also moves the safety output to a closed, or safe, state.

When the illustrative embodiment of FIG. 20 enters the RUN block 930, border scanning preferably continues. Border scanning may include comparison of a live frame to a reference frame. Such comparison may be performed according to the windows defined in the CONFIG block 910. If a border violation is detected, the safety output is opened. A variable may also be defined in the illustrative embodiment as AUTORESTART. AUTORESTART may have two states, for example, 1/0, high/low, on/off, etc. If AUTORESTART is in a first state, the system may autorestart in response to a border violation, entering the CLEAR block 920 (shown at !BORDERCLEAR & AUTORESTART 932) when, during operation in the RUN block 930, a border violation is detected. Alternatively, if AUTORESTART is in a second state, the system may enter the STOP state 950 (shown at !BORDERCLEAR & !AUTORESTART) upon detecting a border violation.

Also in the illustrative example is an UPDATE block 940. The UPDATE block 940 may be entered from the CLEAR 920 (UPDATE REF 926) or RUN 930 (UPDATE REF 934) blocks at some predefined time. The predefined time may be a time related to a border or interior violation, a preset interval from the last updated reference image, or any other time. Also, the predefined time may arise as a result of a manual input or other passage of time. In the illustrative example shown in FIG. 23 below, the safety output is opened while routines in the UPDATE block 940 are performed. In other embodiments, the safety output remains closed, at least in some circumstances, during performance of routines in the UPDATE block 940.

While in the UPDATE block 940, a camera check may be performed, and a new reference image may be captured by the camera(s) of the system. If there are multiple cameras in use, the UPDATE block 940 may take new reference images from each camera, or may only capture a new reference image from one or more of the cameras. The UPDATE block 940 may also include the steps of computing a reference contrast value for each window and validating the sufficiency of the contrast. If the UPDATE block 940 fails to obtain a valid reference image, the UPDATE block 940 may return BAD CONFIG 944 and enter the STOP block 950. Otherwise, if the UPDATE block 940 completes all routines, it may return OK 942 and go into the CLEAR block 920. In other embodiments, it may be possible to return to the RUN block 930 instead of the CLEAR block 920 after completion of the routines of the UPDATE block 940. Also, a failure in the UPDATE block 940 to return OK 942 may send the system into the CONFIG 910 or INIT 900 blocks.

When in the STOP state 950, the illustrative example stops border scanning and remains in a state wherein the safety output is open until the system can be reset or otherwise checked, at which point the system may enter the INIT 900 block again. Other states and relationships between states are also contemplated.

Figure 21:
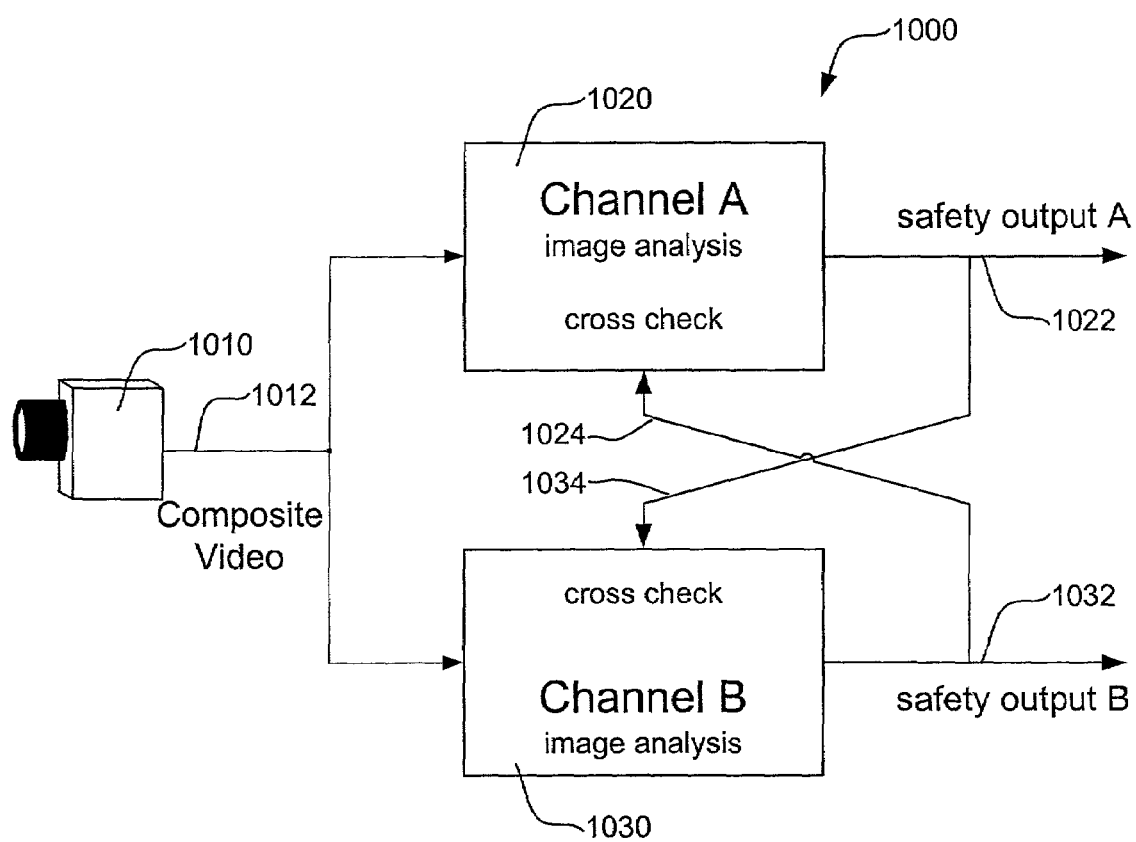
FIG. 21 is a schematic diagram of an illustrative embodiment using multiple channels of data flow in accordance with the present invention.

FIG. 21 is a schematic diagram of an illustrative embodiment using multiple channels of data flow in accordance with the present invention. In this illustrative embodiment, safety camera 1010 gathers images at a certain rate of frames per second, creating a composite video stream 1012. The video stream is split into two channels, Channel A 1020 and Channel B 1030. Channel A 1020 generates Safety Output A 1022, and Channel B 1030 generates Safety Output B. A first cross-check connection 1024 connects Safety Output B 1032 to the image analysis block for Channel A 1020, and a second cross-check connection 1034 connects Safety Output A 1022 to the image analysis block for Channel B 1030.

In the illustrative embodiment, alternating frames in the image stream are available for validation of the camera data. For example, if camera 1010 provides thirty frames per second (fps), 15 fps may be used by Channel A 1020 for safety analysis. The remaining or intervening 15 fps may be analyzed in Channel B 1030 to detect dead pixels, row failures, insufficient lighting, etc. The analysis performed in Channel B 1030 may rely on detecting, in every frame, a boundary marking for the safety zone that provides a sufficient or reliable reference signal. Because camera fault conditions, such as pixel failures, loss of sensitivity, burn out, etc., may also result in insufficient contrast compared to the reference image, such analysis may detect additional safety violations.

Figure 22:
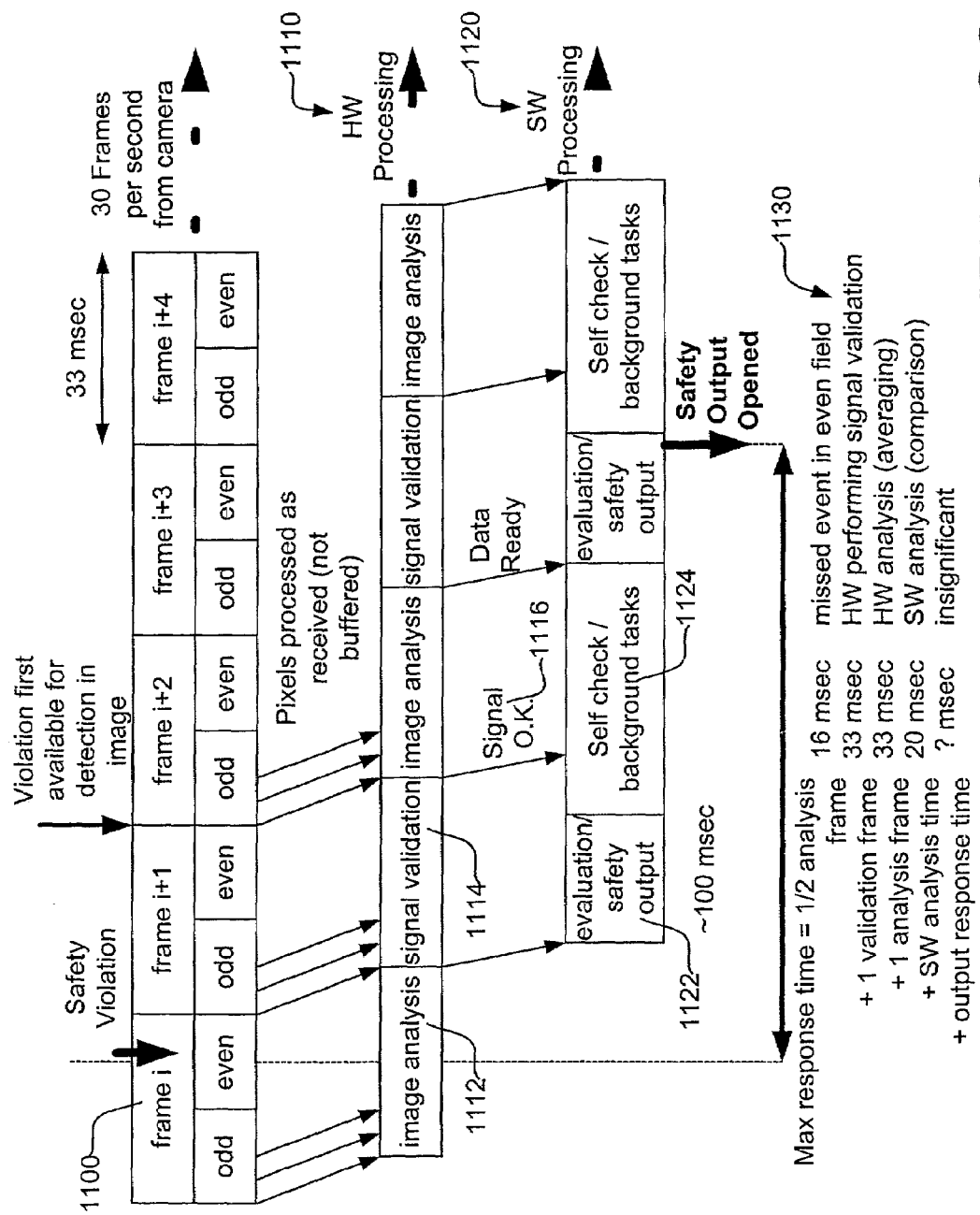
FIG. 22 is a timing diagram showing illustrative timing relationships of the embodiment of FIG. 21.

FIG. 22 is a timing diagram showing illustrative timing relationships of the embodiment of FIG. 21. In the illustrative embodiment, the camera takes a certain number of frames per second; the frames are represented in a first line 1100, enumerated as frame i, frame i+1, etc. Hardware processing 1110 alternates between performing image analysis 1112 and signal validation 1114. In a preferred embodiment, analysis takes place as the pixels are received, rather than in a buffered grouping, so hardware processing 1110 continually analyzes data. At intervals relating to the completion of each frame, software processing 1120 receives data streams from hardware processing 1110. At the end of image analysis 1112 by hardware processing 1110, software processing 1120 performs an evaluation and generates a safety output 1122. Once evaluation and safety output 1122 are completed, software processing 1120 performs self-check and background tasks 1122 until pixel data is again ready to be sent by hardware processing 1110.

At the end of signal validation 1114, hardware processing 1110 also sends a signal to software processing 1120. As shown, the signal may indicate that the signal is properly received, or OK 1116. As shown at lower portion 1130 of FIG. 22, the maximum response time of this embodiment is slower than it was for the earlier illustrative embodiment. However, in exchange for the added response time, the system may be more reliable as the input signal is constantly validated. Such a system may be particularly suitable for harsh environments or where high reliability is required.

Figure 23:
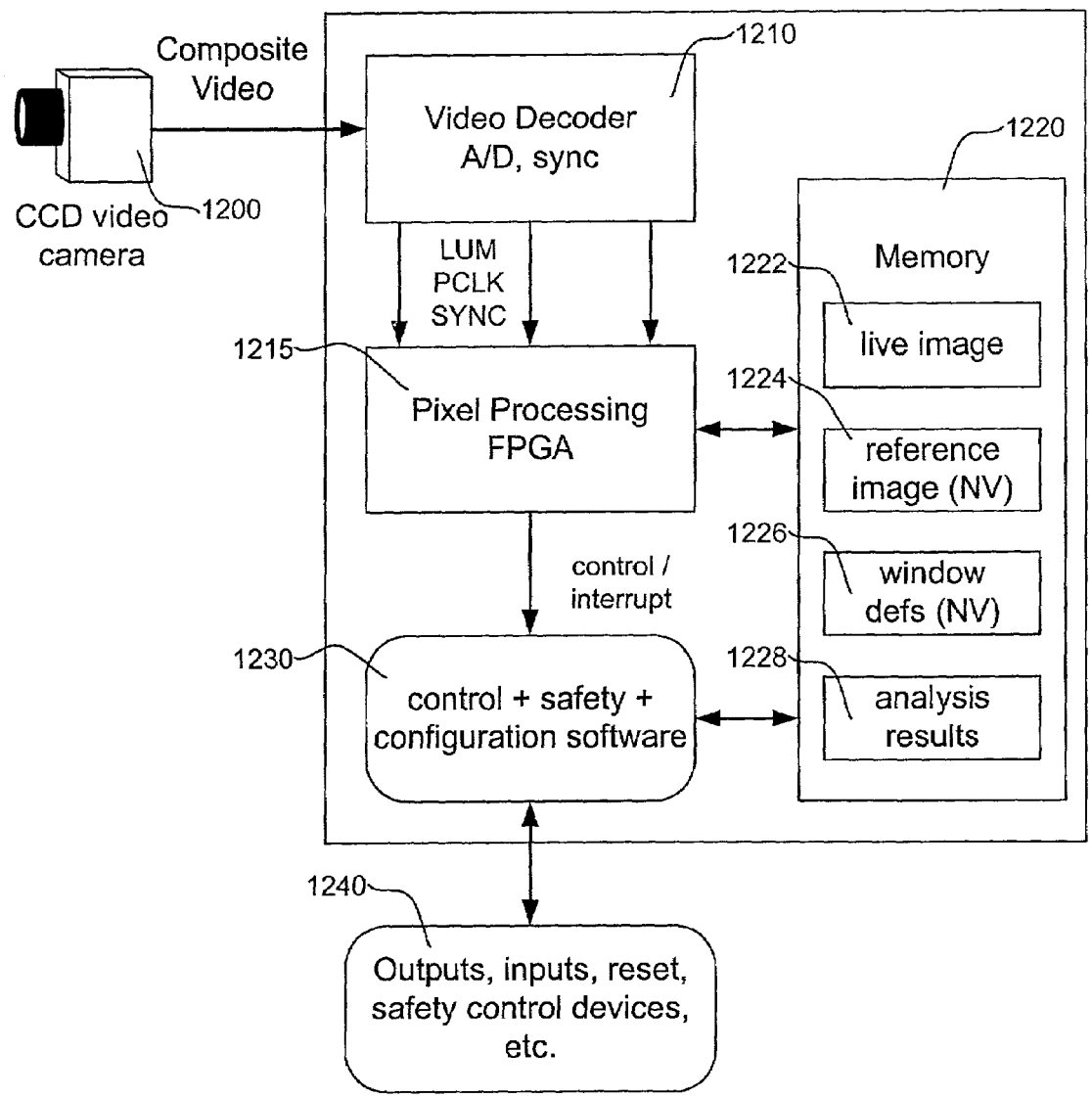
FIG. 23 is a block diagram showing processing, memory and control blocks of an illustrative embodiment of the present invention.

FIG. 23 is a block diagram showing processing, memory and control blocks of an illustrative embodiment of the present invention. In the illustrative embodiment, a CCD video camera 1200 generates a composite video signal. The composite video signal is received by a video decoder 1210. Video decoder 1210 may include an analog/digital converter and a synchronization function. The video decoder generates signals that may indicate luminescence, a pixel clock, and a synchronization signal to a pixel processing block 1215. The pixel processing block 1215 may fetch pixels and perform a contrast comparison algorithm or, in some embodiments, a frame matching algorithm, to determine whether an object has entered a portion of an area of interest. Pixel processing block 1215 also has access to memory 1220, and is preferably capable of saving and retrieving data from memory 1220. Memory 1220 may include a live image 1222, a reference image 1224, window definitions 1226, and analysis results 1228.

Control, safety, and configuration software block 1230 may be accessed by pixel processing block 1215. Control, safety, and configuration software block 1230 may also access and save data to memory block 1220, and receive inputs and generate outputs 1240 as shown. The control, safety, and configuration software block 1230 preferably controls the safety system, as described above.

FIG. 24 is a functional block diagram of another illustrative embodiment of the present invention. In the illustrative embodiment, hardware 1303 includes CCD video camera 1300, video decoder 1310, pixel analysis 1320, analysis windows memory block 1330, analysis window definitions memory block 1340, reference image memory block 1350, and live image memory block 1360. As shown, analysis window definition block 1340 and reference image block 1350 may include flash memory elements. Software 1306 may include system supervision 1370, safety analysis 1375, configuration 1380, and user interface software 1390.

CCD video camera 1300 generates a composite video data signal that is received by video decoder 1310. Video decoder 1310 may include analog/digital conversion capabilities and may generate synchronization data. Video decoder 1310 is controlled by system supervision 1370 during a configuration step. Video decoder 1310 may send luminescence data, clock data, horizontal synchronization data, and vertical synchronization data to pixel analysis block 1320.

In the illustrative embodiment, pixel analysis block 1320 performs a contrast comparison algorithm and image validation. Pixel analysis 1320 provides data regarding pixels to analysis windows 1330, which generates status and results that are then sent on to system supervision 1370 and safety analysis 1375. Pixel analysis block may be controlled by system supervision 1370 to determine the mode of pixel analysis. Pixel analysis can include any number of pixel processing methods including, for example, contrast comparison algorithm mode, frame matching algorithm mode, image validation mode, etc.

Pixel analysis block also send data corresponding to the live image to live image memory block 1360, where the live image may be stored. Configuration 1380 may control live image memory block 1360, and may request live image memory block 1360 to send data to reference image memory block 1350, possibly updating the reference image memory block 1350. Pixel analysis block 1320 receives a reference image from reference image memory block 1350 as well as data relating to the analysis windows from analysis window definitions block 1340. The analysis window definitions enable the pixel analysis 1320 to group pixels together into bins to perform contrast comparison algorithms comparing a live image to a reference image. Analysis window definitions block 1340 receives data from configuration block 1380.

System supervision 1370 receives data from reference image memory block 1350 and analysis window definition block 1340 as well as analysis windows block 1330. System supervision performs tasks including initialization and self-check tasks by controlling the configuration of video decoder 1310 and the mode of pixel analysis 1320, along with controlling safety analysis 1375 and configuration 1380. Safety analysis 1375 evaluates analysis windows 1330 outputs and generates a safety output. Safety analysis also receives generates an error output, which can actually be generated by any of system supervision 1370, safety analysis 1375, or configuration 1380. Safety analysis receives control signals from system supervision 1370.

Configuration 1380 may send data to analysis window definitions 1340, and controls capture of the live image memory block 1360. Via a coupling such as an RS 232 or any other data connection, configuration 1380 sends and receives data to user interface software 1390. Configuration 1380 can also generate an error signal.

During an initialization mode, hardware 1303 is initialized, internal processes are started, and a self-check is performed. Much of initialization can be controlled from system supervision 1370, though information received from camera 1300 and user interface 1390 can be incorporated as well. An error signal will be generated if there is a failure to correctly initialize the system.

In the configuration mode, a new reference image is captured with camera 1300 and sent to the PC operating the user interface software 1390. Safety zone parameters are received from the PC, again using user interface software 1390. Analysis windows definitions 1340 are generated using the safety zone parameters. For each analysis window 1330, the median pixel level (for example, with respect to luminescence) and defined light and dark pixel sets are determined. Reference contrast values are computed and validated, and ultimately sent to the PC to confirm that the reference contrast values are acceptable. The PC user can confirm the validity of reference contrast values. An error will be generated if there is a failure to define a valid safety zone.

In a calibration mode, reference contrast values for each analysis window 1330 are computed. Whether there is sufficient contrast in each window is then validated. Windows lacking sufficient contrast for processing via contrast comparison algorithms are marked for frame differencing analysis.

During a clearing mode, the comparison of live images to a reference image (or reference images) may begin. Once there is an agreement between the comparison of the live image and the reference image, boundary scanning begins, and the safety output is closed (set to "safe"). While the system is running, boundary scans are continued. The safety output will be opened if there is a detected violation.

Having thus described the preferred embodiments of the present invention, those of skill in the art will readily appreciate that the teachings found herein may be applied to yet other embodiments within the scope of the claims hereto attached.

What is claimed is:

1. A method for monitoring an area of interest containing a hazardous or sensitive object, the area of interest having a border and an interior region, wherein the interior region is at least partially defined by the border region, the method comprising the steps of:
    defining an interior region containing the hazardous or sensitive object;
    defining a border region around at least part of the interior region, the border region defining at least part of a safety zone that extends around at least part of the hazardous or sensitive object;
    monitoring at least a portion of the border region of the area of interest for breach by an object while not monitoring at least part of the interior region of the area of interest; and
    monitoring at least a portion of the interior region of the area of interest for the object after the object breaches the border region.

2. The method of claim 1 further comprising the step of:
    ceasing to monitor the interior region of the area of interest after the object leaves the area of interest; and
    continuing to monitor at least a portion of the border region of the area of interest after the object leaves the area of interest.

3. The method of claim 1 wherein the interior region of the area of interest is not monitored until the object no longer breaches the border region of the area of interest.

4. The method of claim 1 further comprising the step of:
    continuing to monitor at least a portion of the border region of the area of interest while the interior region is being monitored.

5. The method of claim 1 further comprising the step of providing a safety output when the border region is breached by the object.

6. The method of claim 5 wherein the safety output disables a piece of hazardous or sensitive equipment located in the area of interest.

7. The method of claim 5 wherein the safety output sounds an alarm.

8. The method of claim 1 wherein the border region comprises a continuous region.

9. The method of claim 1 wherein the border region comprises an interrupted region.

10. The method of claim 1 wherein the area of interest excludes a defined region from its interior.

11. A method for monitoring an area of interest having a border and an interior, the method comprising the steps of:
    capturing a sequence of capture images of the area of interest, wherein each of the capture images capture at least part of the interior of the area of interest;
    identifying one or more border regions in each of the captured images that correspond to the border of the area of interest;
    analyzing the one or more border regions in the captured images and determining if an object has entered the one or more border regions of the area of interest; and
    outputting a signal indicating when an object has entered the one or more border regions of the area of interest, wherein at least part of the interior of the area of interest of the capture images is not monitored until a determination is made that an object has entered the one or more border regions.

12. The method of claim 11 wherein the one or more border regions include a reference marking.

13. The method of claim 11 wherein the reference marking is a predetermined pattern.

14. The method of claim 11 wherein the step of analyzing the one or more border regions of the captured images comprises the step of comparing the one or more border regions of the capture images to one or more corresponding regions of a reference image.

15. The method of claim 14 wherein the border of the area of interest includes a reference marking, and the one or more border regions in the reference image are identified by identifying the reference marking in the reference image.

16. The method of claim 15 wherein the reference marking is a predetermined pattern.

17. The method of claim 16 wherein the predetermined pattern determines a minimum size of the objects to be detected.

18. The method of claim 11 further comprising the step of storing a capture image when an object has entered the area of interest.

19. The method of claim 18 further comprising the step of viewing the stored capture image at a later time.

20. The method of claim 14 wherein the reference image is taken in response to a change in one or more conditions in the area of interest.

21. The method of claim 14 wherein the reference image is taken at a set time interval.

22. The method of claim 11 wherein the step of analyzing the one or more border regions of the captured images comprises the step of comparing the one or more border regions of the capture images to corresponding regions of two or more reference images.

23. The method of claim 22 wherein at least one comparison detects relatively immediate changes, and at least one comparison detects accumulated changes.

24. A method for monitoring an area of interest having a border and an interior region, the method comprising the steps of:
 capturing at least two images of the area of interest using two separate image capturing devices;
 identifying one or more border regions in each captured image that corresponds to the border of the area of interest, each captured image including at least a portion of the interior region;
 analyzing the one or more border regions of the captured images but not at least part of the interior region to determine when an object enters the area of interest; and
 outputting a signal indicating whether or not an object has entered the area of interest.

25. The method of claim 24, wherein the image capturing devices are video cameras.

26. The method of claim 24, wherein the image capturing devices are digital cameras.

27. A system for monitoring an area of interest having a border and an interior region, comprising:
 capturing means for capturing a capture image of the area of interest; and
 analyzing means for analyzing at least a portion of the capture image corresponding to the border region of the area of interest for breach by an object, and for analyzing at least a portion of the capture image corresponding to the interior region of the area of interest for the presence of the object after the object breaches the border; wherein the analyzing means does not analyze at least part of the capture image corresponding to at least part of the interior region unless an object breaches the border region.

28. A system for monitoring an area of interest, comprising:
 image capturing means for capturing at least one image of the area of interest;
 first processing means for processing at least one of the capture images to determine if an object has entered the area of interest;
 second processing means for processing at least one of the capture images to determine if an object has entered the area of interest; and
 output means for outputting a signal indicating that an object has entered the area of interest when both the first processing means and second processing means indicate that an object has entered the object of interest.

29. A system according to claim 28 wherein the image capturing means includes a single image capture device.

30. A system according to claim 28 wherein the image capturing means includes two image capture devices each providing a separate image of the area of interest, wherein a first one of the image capture devices provides a first image of the area of interest to the first processing means and a second one of the image capture devices provides a second image of the area of interest to the second processing means.

31. A method for monitoring an area of interest having a border region and an interior region, the method comprising the steps of:
 monitoring at least a portion of the border region of the area of interest for breach by an object having a first minimum size; and
 monitoring at least a portion of the interior region of the area of interest for an object having a second minimum size after the object breaches the border region of the area of interest.

32. The method of claim 31 wherein the first minimum size is smaller than the second minimum size.

33. The method of claim 31 wherein the first minimum size is bigger than the second minimum size.

34. The method of claim 31 wherein the interior region is defined to include the border region.

35. The method of claim 31 wherein the interior region is defined to exclude the border region.

36. A method for monitoring an area of interest having two or more regions, each region having a border region and an interior region, the method comprising the steps of:
 capturing a capture image of the area of interest;
 monitoring the border region of a first region of the area of interest for breach by an object while not monitoring at least part of the interior region of the first region, and monitoring at least a portion of the interior region of the first region for the object after the object breaches the border region of the first region;
 monitoring the border region of a second region of the area of interest for breach by an object while not monitoring at least part of the interior region of the second region, and monitoring at least a portion of the interior region of the second region for the object after the object breaches the border region of the second region.

37. The method of claim 36 wherein the border and/or interior region of the first region are monitored independently of the border and/or interior region of the second region.

38. The method of claim 36 wherein the border and/or interior regions of the first and second region are selectively monitored.

39. The method of claim 38 wherein the border and/or interior region of the first region are monitored and the border and/or interior region of the second region are not monitored.

40. The method of claim 38 wherein the border and/or interior region of the first region are monitored and the border and/or interior region of the second region are also monitored.

41. The method of claim 38 wherein the border and/or interior region of the first region are not monitored and the border and/or interior region of the second region are not monitored.

42. The method of claim 1, wherein the step of monitoring at least a portion of the safety zone optically monitors at least a portion of the border region of the area of interest for breach by an object.

43. The system of claim 27, wherein the analyzing means optically analyzes at least a portion of the capture image corresponding to at least a portion of the border region of the area of interest for breach by an object.

44. A method for monitoring an area of interest in a field of view of an image capture device, the method comprising the steps of:

defining a border in the field of view of the image capture device, wherein the border at least partially defines an interior region of the area of interest;

monitoring at least a portion of the border region of the area of interest for breach by an object while not monitoring at least part of the interior region of the area of interest; and monitoring at least a portion of the interior region of the area of interest for the object after the object breaches the border.

45. A method for monitoring an area of interest having a border and an interior, the method comprising the steps of:

capturing a capture image of the area of interest;

identifying one or more border regions in the captured image that correspond to the border of the area of interest;

analyzing the one or more border regions of the captured image and determining if an object has entered the one or more border regions of the area of interest, wherein the one or more border regions of the captured image are analyzed by comparing the one or more border regions of the capture image to corresponding regions of two or more reference images, wherein at least one comparison detects relatively immediate changes, and at least one comparison detects accumulated changes; and outputting a signal indicating when an object has entered the one or more border regions of the area of interest.

* * * * *